(12) United States Patent
Toda

(10) Patent No.: US 7,035,833 B2
(45) Date of Patent: Apr. 25, 2006

(54) SYSTEM WHICH EXTRACTS FEATURE FROM FUZZY INFORMATION AND SEMICONDUCTOR INTEGRATED CIRCUIT DEVICE HAVING THE SYSTEM

(75) Inventor: Haruki Toda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 630 days.

(21) Appl. No.: 10/315,946

(22) Filed: Dec. 11, 2002

(65) Prior Publication Data

US 2003/0115166 A1 Jun. 19, 2003

(30) Foreign Application Priority Data

Dec. 13, 2001 (JP) ............................. 2001-380322

(51) Int. Cl.
*G06N 3/00* (2006.01)
(52) U.S. Cl. .............................. 706/1; 706/52; 706/900
(58) Field of Classification Search .................... 706/1, 706/52, 900
See application file for complete search history.

(56) References Cited

U.S. PATENT DOCUMENTS

| | | | | |
|---|---|---|---|---|
| 4,077,030 A * | 2/1978 | Helava | ................. | 340/870.13 |
| 5,222,191 A * | 6/1993 | Enomoto | ..................... | 706/4 |
| 5,249,258 A * | 9/1993 | Hisano | ......................... | 706/1 |
| 5,661,421 A * | 8/1997 | Ohmi et al. | ................... | 327/63 |
| 5,893,085 A * | 4/1999 | Phillips et al. | ................. | 706/52 |
| 5,990,709 A * | 11/1999 | Thewes et al. | ................ | 327/89 |
| 6,075,338 A * | 6/2000 | Mazza et al. | ................ | 318/803 |
| 6,101,106 A * | 8/2000 | Shi | ............................. | 363/41 |
| 6,111,447 A * | 8/2000 | Ternullo, Jr. | ................. | 327/292 |
| 6,157,234 A * | 12/2000 | Yamaguchi | .................. | 327/175 |
| 6,307,500 B1 * | 10/2001 | Cornman et al. | ......... | 342/26 R |
| 6,661,022 B1 * | 12/2003 | Morie et al. | ................... | 257/14 |
| 2002/0140459 A1 | 10/2002 | Toda et al. | | |

FOREIGN PATENT DOCUMENTS

| | | |
|---|---|---|
| JP | 07-093277 | 4/1995 |
| JP | 2001-51969 | 2/2001 |

* cited by examiner

*Primary Examiner*—Wilbert L. Starks
*Assistant Examiner*—Mai T. Tran
(74) *Attorney, Agent, or Firm*—Banner & Witcoff, Ltd.

(57) ABSTRACT

A system includes a sensor section which receives fuzzy information inputs X containing a plurality of components and converts the plurality of components into a plurality of measurable input physical quantities, a converter which receives a plurality of input physical quantities and converts the input physical quantities into a plurality of pulses having pulse widths corresponding to the magnitudes thereof, and a feature extraction section (NF) which receives a plurality of pulses, selects the plurality of pulses by using a set pulse width as a reference, and extracts feature information items $y_0$, $y_1$, $y_2$, . . . which express the features of the fuzzy information inputs X from the fuzzy information inputs X according to the number of selected pulses.

56 Claims, 15 Drawing Sheets

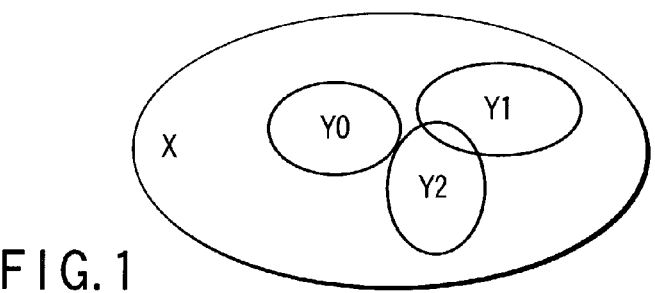
F I G. 1
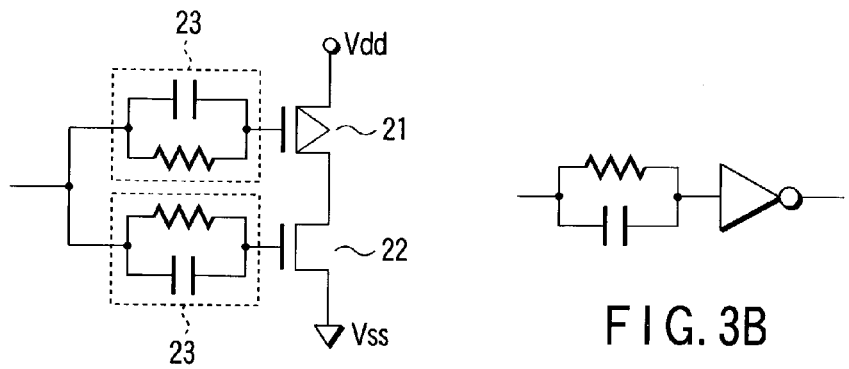
F I G. 3A
F I G. 3B
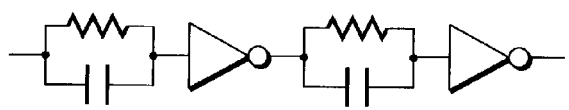
F I G. 3C
F I G. 3D
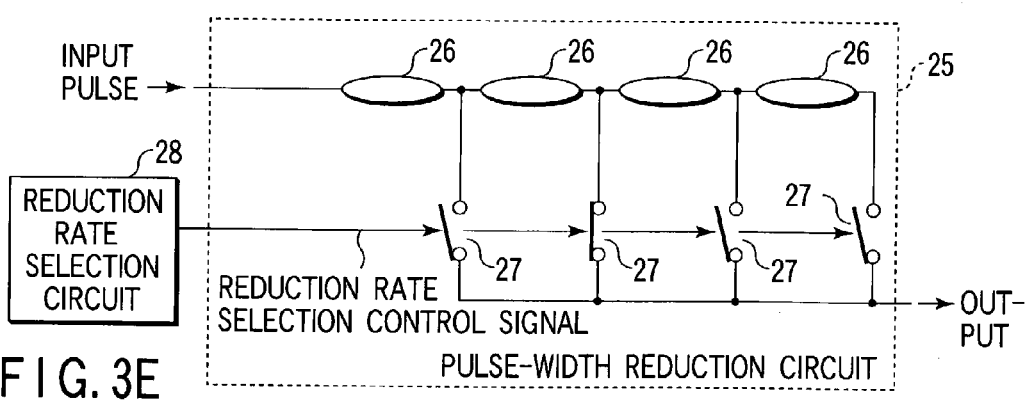
F I G. 3E

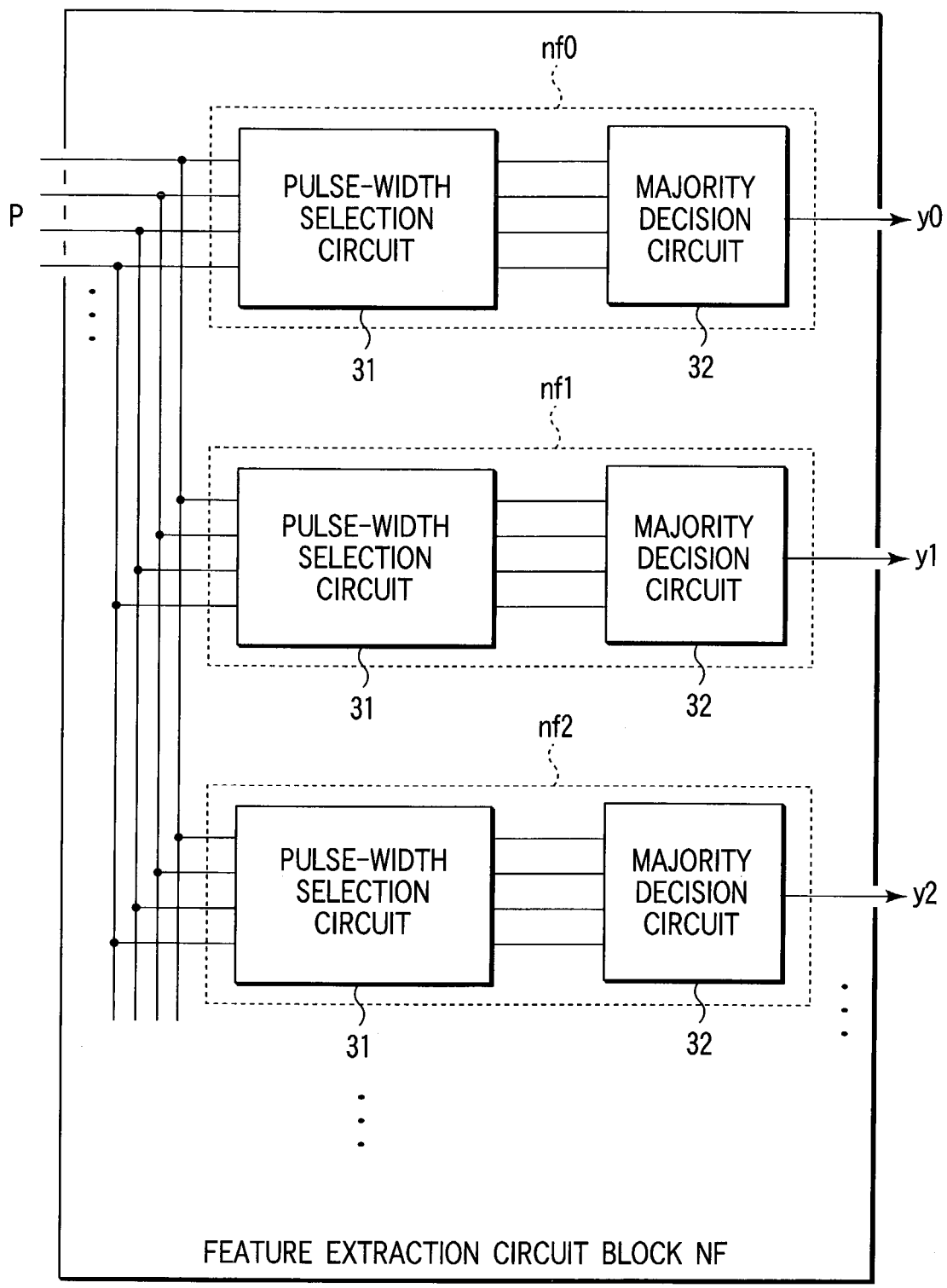
F I G. 7

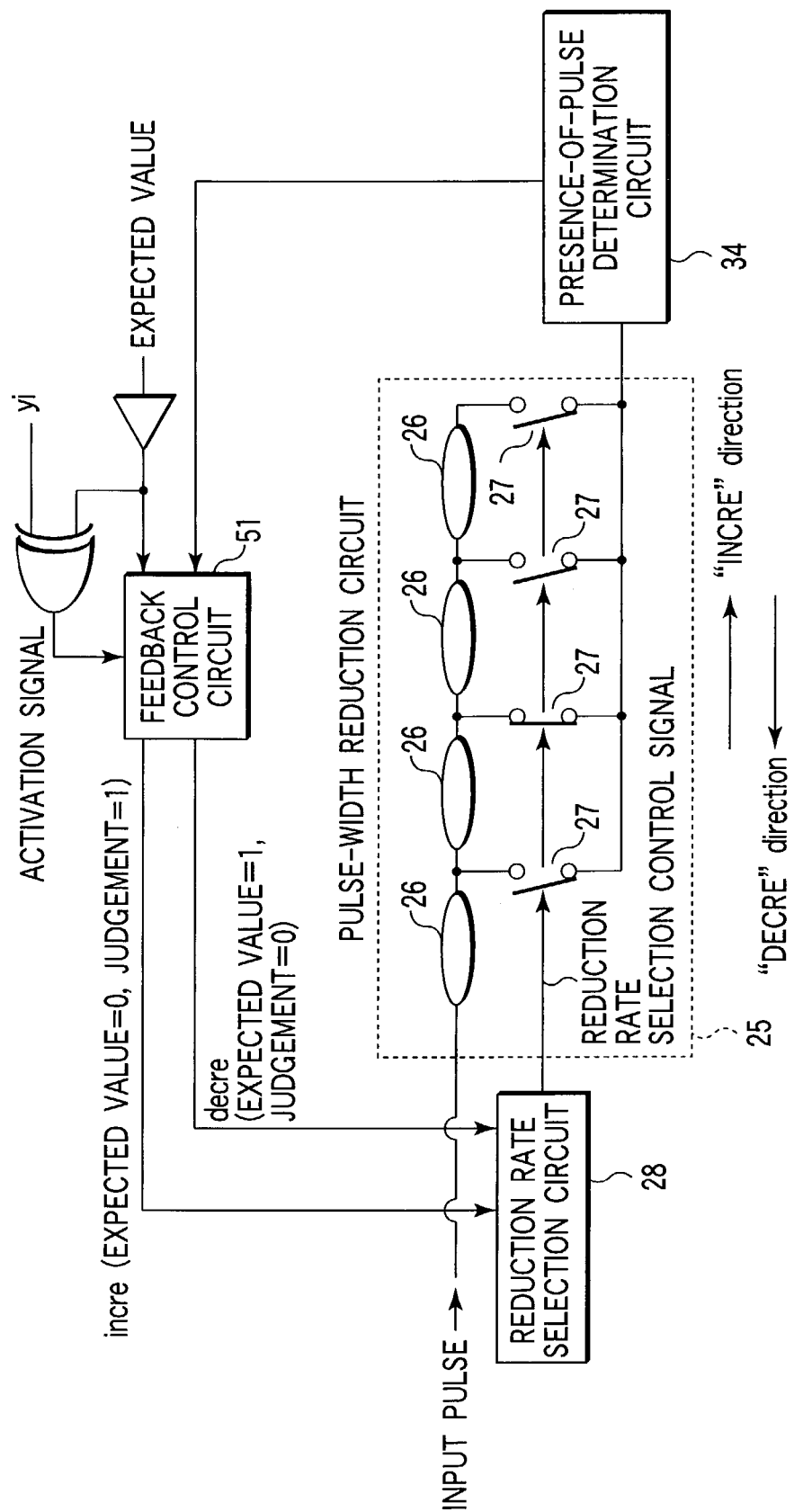
F I G. 9

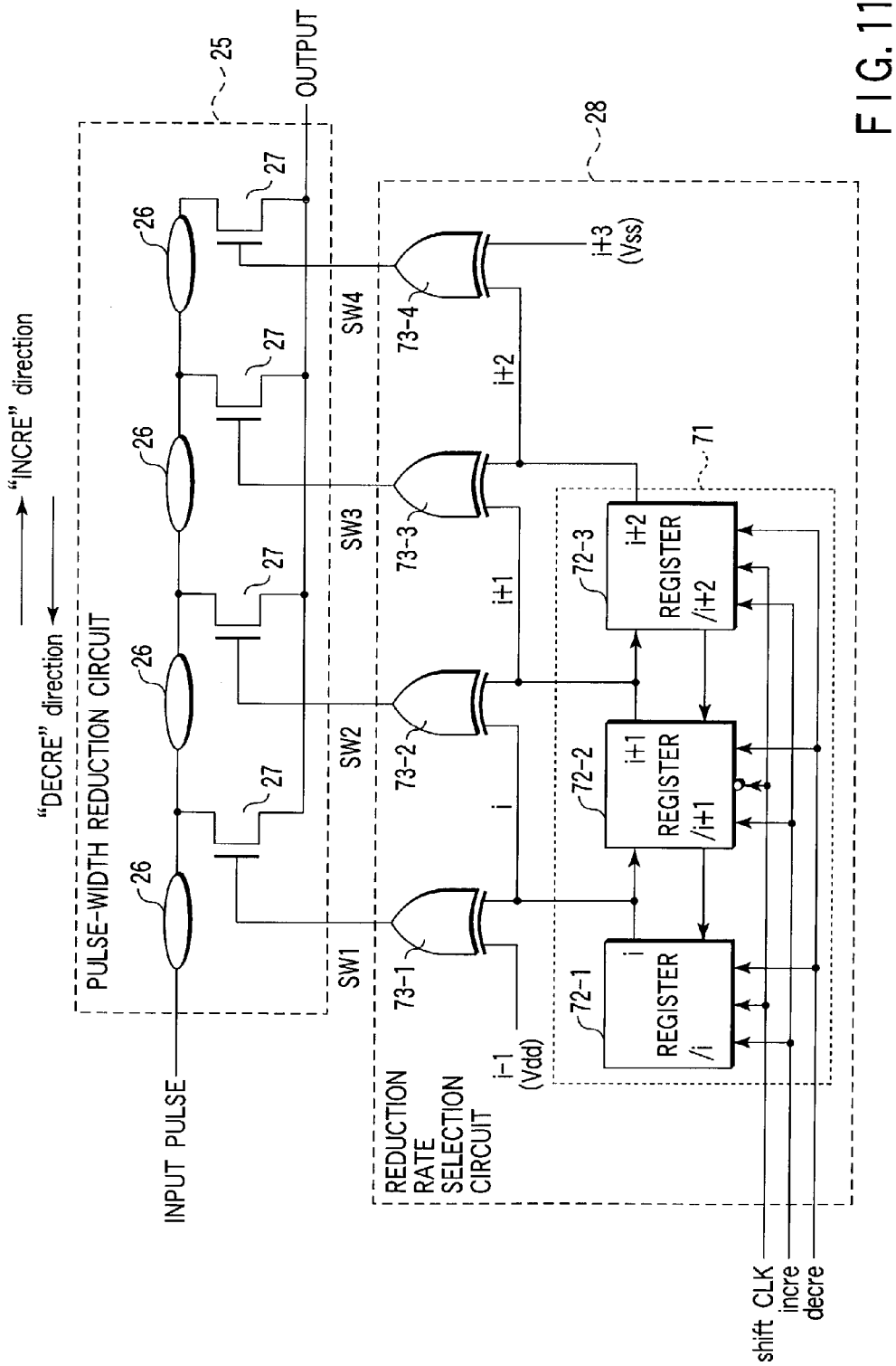
F I G. 11

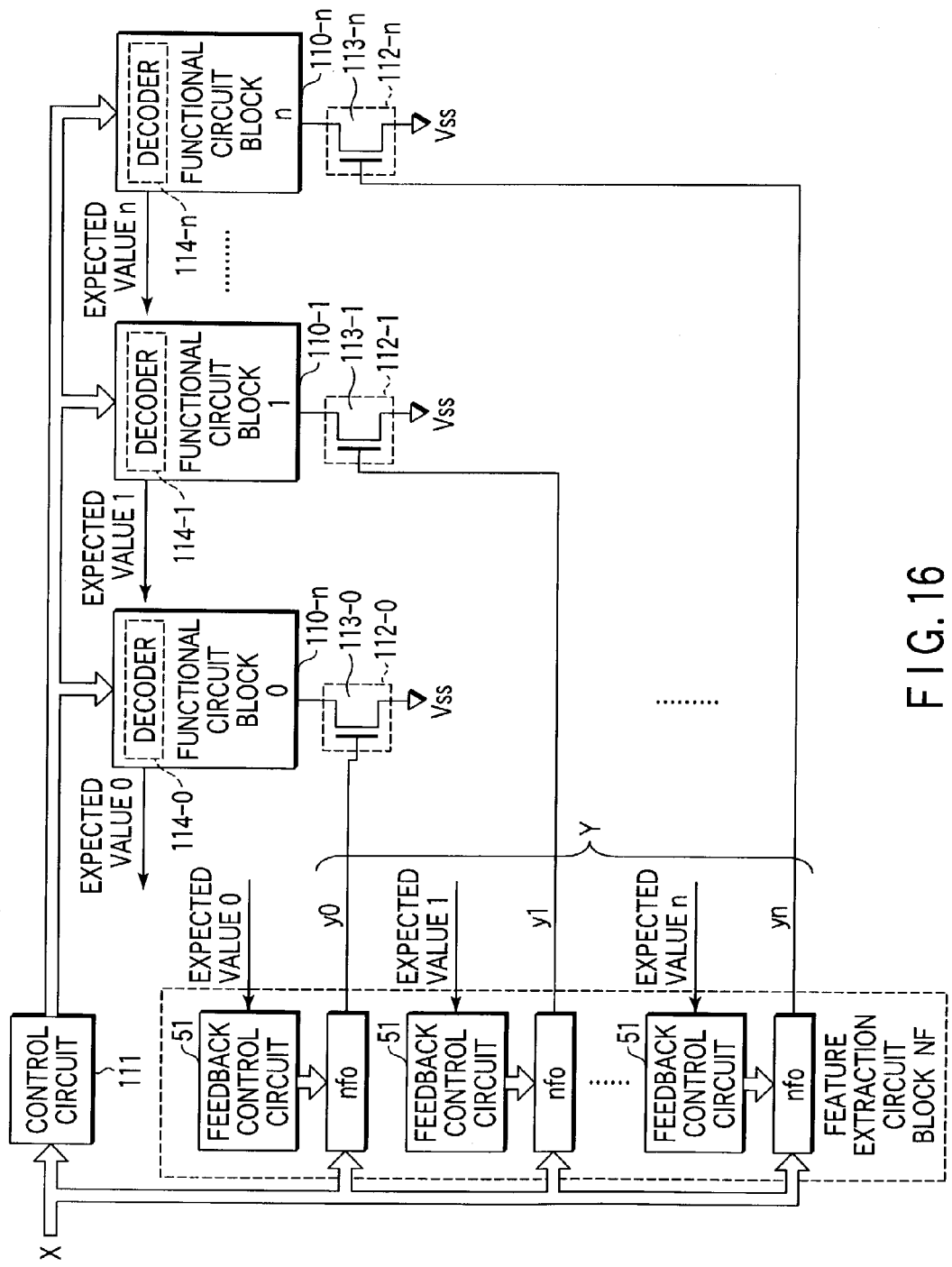
F I G. 16

SYSTEM WHICH EXTRACTS FEATURE FROM FUZZY INFORMATION AND SEMICONDUCTOR INTEGRATED CIRCUIT DEVICE HAVING THE SYSTEM

CROSS-REFERENCE TO RELATED APPLICATIONS

This application is based upon and claims the benefit of priority from the prior Japanese Patent Application No. 2001-380322, filed Dec. 13, 2001, the entire contents of which are incorporated herein by reference.

BACKGROUND OF THE INVENTION

1. Field of the Invention

This invention relates to a feature extracting system and semiconductor integrated circuit device and more particularly to a system which extracts the same feature information, for example, common feature information from fuzzy information items in which the features cannot be determined because detail information items are different from one another, and a semiconductor integrated circuit device having a feature extracting function.

2. Description of the Related Art

Even if information items acquired in various situations have the same feature, all of the detail contents thereof are not always coincident with one another.

In the conventional digital process, it is easy to replace information items by bits, compare the bits and determine coincidence or non-coincidence thereof at high speed. However, if some fuzzy information items in which the features cannot be determined because detail information items thereof are different from one another are given, it is difficult to determine whether or not the fuzzy information items have the same feature information.

Conventionally, an attempt is made to perform the above determination process by performing a process by using a complicated software or by use of a so-called neurosystem which has analog elements such as resistors as main constituent elements, uses the resistors in various portions and changes the resistances thereof.

However, if the process for determining whether or not the information items have the same feature information is performed by use of a complicated software, there occurs a problem that it takes a long time until the final determination is made, for example. Therefore, it is disadvantageous in enhancing the operation speed of the information process, for example.

Further, if the above process is performed by use of the neurosystem, it is necessary to integrate analog elements such as resistors in a large scale in the semiconductor integrated circuit chip. Therefore, it is disadvantageous in lowering the power consumption and making the device small.

BRIEF SUMMARY OF THE INVENTION

A feature extracting system according to a first aspect of the present invention comprises a sensor which receives fuzzy information inputs containing a plurality of components and converts the plurality of components into a plurality of measurable input physical quantities, a converter which receives the plurality of input physical quantities and converts the input physical quantities into a plurality of pulses having pulse widths corresponding to the magnitudes thereof, and a feature extraction circuit which receives the plurality of pulses, selects the plurality of pulses by using a set pulse width as a reference and extracts feature information expressing features of the fuzzy information inputs from the fuzzy information inputs according to the number of selected pulses.

A semiconductor integrated circuit device according to a second aspect of the present invention comprises a converter circuit which receives fuzzy information inputs containing a plurality of measurable components and converts the plurality of components into a plurality of pulses having pulse widths corresponding to the magnitudes thereof, and a feature extraction circuit which receives the plurality of pulses, selects the plurality of pulses by using a set pulse width as a reference, and extracts feature information expressing features of the fuzzy information inputs from the fuzzy information inputs according to the number of selected pulses.

BRIEF DESCRIPTION OF THE SEVERAL VIEWS OF THE DRAWING

FIG. 1 is a diagram showing the relation between fuzzy information X and feature information Y;

FIG. 3A is an equivalent circuit diagram of a basic unit element used in a pulse-width reduction circuit, FIG. 3B is a diagram showing a symbol which expresses the basic unit element shown in FIG. 3A, FIG. 3C is an equivalent circuit diagram of a delay element using the basic unit element shown in FIG. 3A, FIG. 3D is a diagram showing a symbol which expresses the delay element shown in FIG. 3C, and FIG. 3E is a block diagram showing an example of the configuration of the pulse-width reduction circuit;

FIG. 7 is a block diagram showing an example of the configuration of a feature extraction circuit block NF using the circuit blocks nfi;

FIG. 9 is a block diagram showing an example of a pulse-width adjusting mechanism of the pulse-width selection circuit;

FIG. 11 is a block diagram showing an example of the configuration of a reduction rate control circuit;

FIG. 16 is a block diagram showing a system LSI with power management function according to a fourth embodiment of the present invention.

DETAILED DESCRIPTION OF THE INVENTION

There will now be described embodiments of this invention with reference to the accompanying drawings. In the explanation, common reference symbols are attached to like portions throughout the whole drawings.

FIRST EMBODIMENT

As shown in FIG. 1, when a region of information X containing a series of detail information items is surrounded by a large frame, the same features can be expressed as regions indicated by smaller frames Y0, Y1, Y2, . . . inside the large frame (of course, there exists a region in a boundary area in which it is not clearly determined that the feature belongs to which one of the regions, but it can be considered that the feature determination process in the boundary area can be performed at the same probability for the respective features).

The first embodiment relates to one example of a feature extraction system which easily extracts feature information Y (Y0, Y1, Y2, . . . ), for example, if the feature information Y is contained in fuzzy information X in which features cannot be clearly determined because detail information items are different, that is, which degenerates and outputs the same feature information Y and one example of a semiconductor integrated circuit device having the above feature extraction system.

Figure 2A:
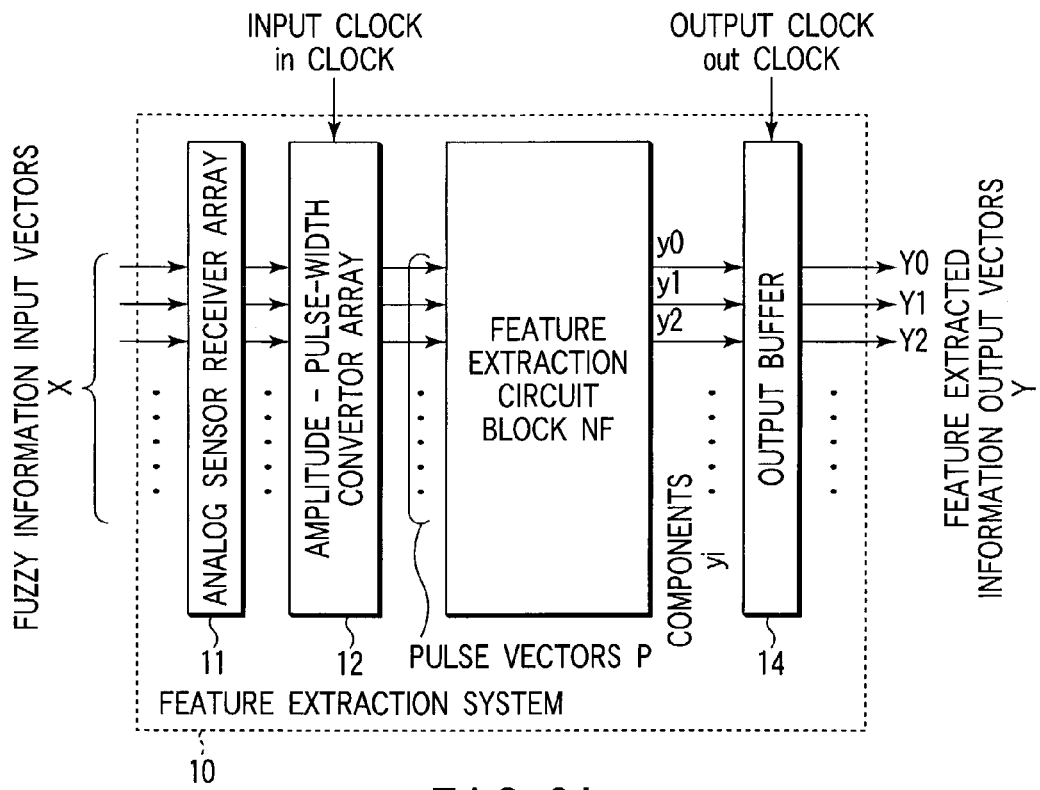
FIG. 2A is a block diagram showing a feature extracting system according to a first embodiment of the present invention and FIG. 2B is a block diagram showing an example of the configuration of a feature extraction circuit block NF.

FIG. 2A is a block diagram showing the feature extraction system according to the first embodiment of the present invention.

As shown in FIG. 2A, a feature extraction system 10 according to the first embodiment extracts feature information output vectors Y from fuzzy information input vectors X. For example, feature information items of the fuzzy information input vectors X are always output as the feature information output vectors Y. The fuzzy information input vectors X correspond to the large frame X shown in FIG. 1, for example, and the feature information output vectors Y (Y0, Y1, Y2, . . . ) correspond to the small frames Y0, Y1, Y2 inside the large frame shown in FIG. 1, for example.

In the first embodiment, fuzzy information is input as vectors of a signal having a plurality of components, that is, as the fuzzy information input vectors X to a sensor section which is, for example, an analog sensor receiver array 11. The components of the input vectors can be any type of quantity which can be converted into physical quantities expressing the magnitudes thereof, for example, an electrical signal such as voltages or currents, that is, measurable physical quantities by use of a sensor, for example. The analog sensor receiver array 11 converts the components of the input vectors into measurable physical quantities by use of a group of sensors provided in the analog sensor receiver array 11. The input vectors converted into the measurable physical quantities are input to a converter section, for example, amplitude-pulse-width converter circuit array 12.

The amplitude-pulse-width converter circuit array 12 converts physical quantity inputs, for example, as analog quantities into a plurality of pulses having pulse widths corresponding to the magnitudes of the physical quantities, for example, the intensities thereof. The above conversion process can be performed by, for example, temporarily converting the physical quantities into digital quantities by use of an analog-digital converter circuit and then converting the digital quantities by use of a pulse creation circuit or the like using delay lines which are set under digital control.

Further, for example, the feature extraction system 10 according to the first embodiment is controlled by an input clock inCLOCK and output clock outCLOCK in order to set adequate timings. For this purpose, the input vectors are fetched in synchronism with the input clock inCLOCK by the amplitude-pulse-width converter circuit array 12, for example. Outputs of the amplitude-pulse-width converter circuit array 12 corresponding to the respective components of the input vectors are input as pulse vectors P containing pulses having various pulse widths as the components thereof to a feature extraction section, for example, feature extraction circuit block NF.

The feature extraction circuit block NF extracts features from the pulse vectors P and supplies components yi of the feature information output vectors with $yi = nfi(P)$ ($i = 0, 1, 2, \ldots$). The component yi is a digital quantity which is selectively set to a value of "0" or "1". In this case, nfi is a function which sets up a correspondence relation between "multiple" and "one". An output buffer 14 outputs the components yi at a certain timing in synchronism with the output clock outCLOCK as feature information output vectors Y.

Figure 2B:
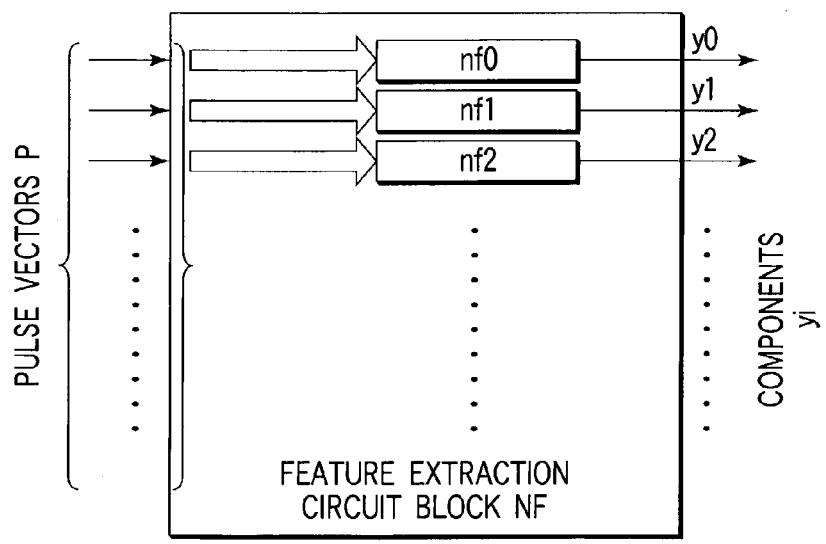

FIG. 2B is a block diagram showing an example of the configuration of the block NF shown in FIG. 2A.

As shown in FIG. 2B, the block NF includes circuit blocks nfi corresponding to the functions nfi for each of the components of the feature information output vectors Y The pulse vectors P are all input to the circuit blocks nfi.

Next, one example of the operation of the feature extraction system 10 according to the first embodiment is explained.

The feature extracting process is a converting process which provides the same outputs when it is recognized that the features of given inputs are the same. The conversion process in the feature extraction system 10 according to the first embodiment can be expressed as follows by use of an operation matrix W and operator M when the input is set as X and the output is set as Y.

$$Y = MWX$$

Specifically, the operation matrix W is expressed as follows.

$$W = \begin{vmatrix} W_{00} & W_{01} & \cdots & W_{0n} \\ W_{10} & W_{11} & \cdots & W_{1n} \\ \vdots & \vdots & & \vdots \\ W_{n0} & W_{n1} & & W_{nn} \end{vmatrix}$$

Wij acts on the component x of the input X to derive the following equation.

$$W_{ij} \cdot x_j = (0; |x_j| < a_{ij},\ 1; |x_j| \geq a_{ij})$$

In this case, after the inputs are converted into pulse widths, each aij becomes an amount which determines a threshold value used to determine whether or not the pulse of the component is reduced and extinguished and the contents of feature extraction are determined by controlling the value thereof. Therefore, the respective components of the inputs are selected according to a set of the threshold values. Since the thus selected input becomes "1", a vector obtained before the operator M acts becomes a component having a value of "0" to "n+1". The operator M acts on each component xi of the vector WX as follows.

$$M \cdot x_i = \left(0; x < \frac{n}{2}, 1; x \geq \frac{n}{2}\right)$$

This indicates that the majority operation is performed with respect to the number of selected inputs. That is, "1" is output for each component of the vector when more than half of the input components are selected. The output is a vector in which the feature of the input is expressed according to the threshold value aij.

In the circuit block nfi shown in FIG. 2B, a pulse-width reduction circuit is used to selectively extinguish the pulses. The operation of the pulse-width reduction circuit corresponds to the setting operation of the threshold value in the above general explanation. Next, one example of the pulse-width reduction circuit is explained.

FIG. 3A is an equivalent circuit diagram of a basic unit element used in the pulse-width reduction circuit.

The basic unit element shown in FIG. 3B is basically an inverter circuit and circuit elements 23 which can be each expressed by an equivalent circuit having a capacitor C and a resistor R connected in parallel are respectively connected to the gates of a P-channel MOSFET 21 and N-channel MOSFET 22. As was previously filed by the applicant of the present invention and others, the above inverter circuit functions to reduce the propagating pulse width when the pulse width is shorter than a certain pulse width (Patent Application No. 2001-95310. U.S. patent application Ser. No. 10/104,069, filed Mar. 25, 2002. The entire contents of U.S. patent application Ser. No. 10/104,069 are incorporated herein by reference). Concisely, the delay amount of the leading edge portion of the input pulse is constant irrespective of the pulse width of the input pulse, but the delay amount of the trailing edge portion of the input pulse is reduced according to the pulse width of the input pulse by using the circuit elements 23. By reducing the delay amount of the trailing edge portion, the propagating pulse width is reduced. As a transistor having the circuit element 23 in the structure thereof, there is provided a transistor shown in FIG. 4A, for example.

Figure 4A:
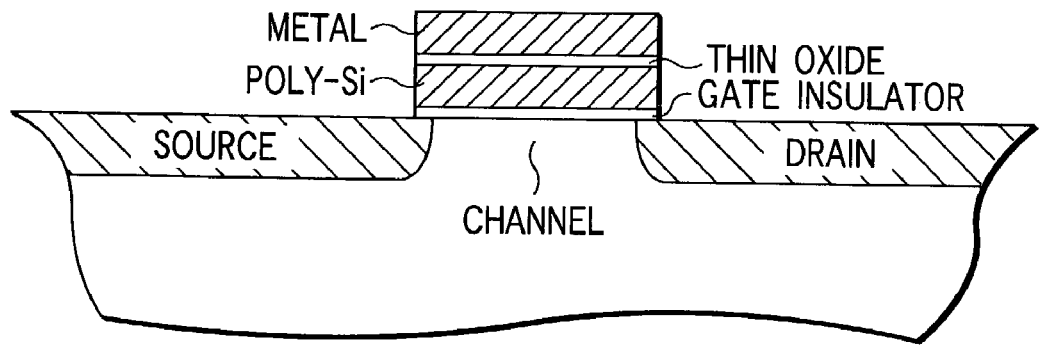
FIG. 4A is a cross sectional view showing a transistor having a circuit element 23 in the structure thereof and FIG. 4B is an equivalent circuit diagram of the transistor shown in FIG. 4A.
Figure 4B:
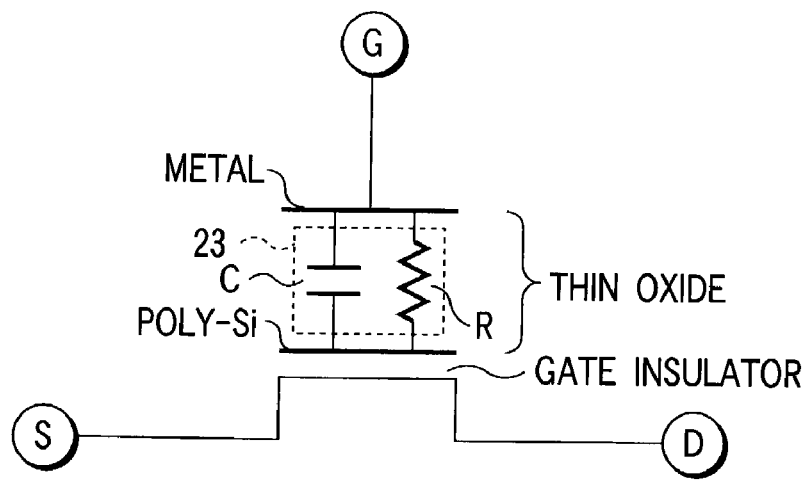

The gate of the transistor shown in FIG. 4A includes a first conductive layer, for example, a conductive polysilicon layer (POLY-Si), a second conductive layer, for example, a metal layer (METAL) such as a tungsten layer, and an insulating layer, for example, a thin silicon oxide film (THIN OXIDE) existing on the interface between the polysilicon layer and the metal layer. As shown in FIG. 4B, in the gate with the above structure, a capacitive component C and a resistive component R are provided on the interface between the conductive polysilicon layer and the metal layer. The capacitive component C is formed by using the metal layer and conductive polysilicon layer as one electrode and the other electrode and using the thin silicon oxide film as a dielectric film. Further, the resistive component R is formed by the tunnel effect which occurs in the thin silicon oxide film between the metal layer and the conductive polysilicon layer. Thus, the transistor has the circuit element 23 in the structure thereof.

FIG. 3B shows a symbol which expresses the inverter circuit shown in FIG. 3A. Further, FIG. 3C shows a delay element configured by cascade-connecting two inverter circuits having the same configuration as the inverter circuit shown in FIG. 3A. FIG. 3D shows a symbol which expresses the delay element shown in FIG. 3C.

As the input pulse propagates along a larger number of delay elements shown in FIG. 3C, the pulse width is more reduced. Therefore, by controlling the number of delay elements along which the input pulse propagates, a so-called filter in which a pulse having pulse width shorter than preset pulse width is extinguished and the other pulses can pass through can be configured. The cutoff value of the pulse width of the filter can be finely adjusted by controlling the number of delay elements to be connected. One example of the pulse-width reduction circuit is shown in FIG. 3E.

As shown in FIG. 3E, a pulse-width reduction circuit 25 of one example has switches 27 used to selectively determine the number of delay elements 26 through which an input pulse is supplied to the output port. Switching of the switches 27 is made according to a reduction rate selection control signal which is output from a reduction rate selection circuit 28. One example of a circuit block nfi using the pulse-width reduction circuits 25 is shown in FIGS. 5A and 5B.

Figure 5A:
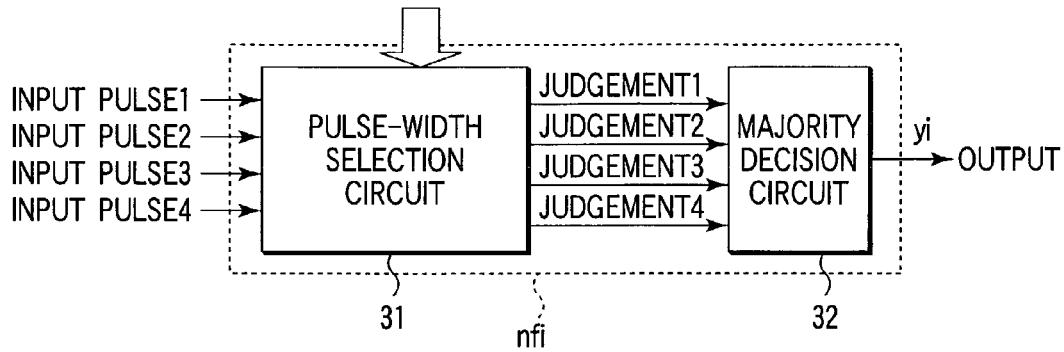
FIG. 5A is a block diagram showing an example of the configuration of a circuit block nfi and FIG. 5B is a block diagram showing an example of the configuration of a pulse-width selection circuit shown in FIG. 5A.

As shown in FIG. 5A, the circuit block nfi includes a pulse-width selection circuit 31 and majority decision circuit 32. The pulse-width selection circuit 31 receives input pulses 1, 2, 3, 4. The input pulses 1, 2, 3, 4 are components of the pulse vectors P. One example of the pulse-width selection circuit 31 is shown in more detail in FIG. 5B.

Figure 5B:
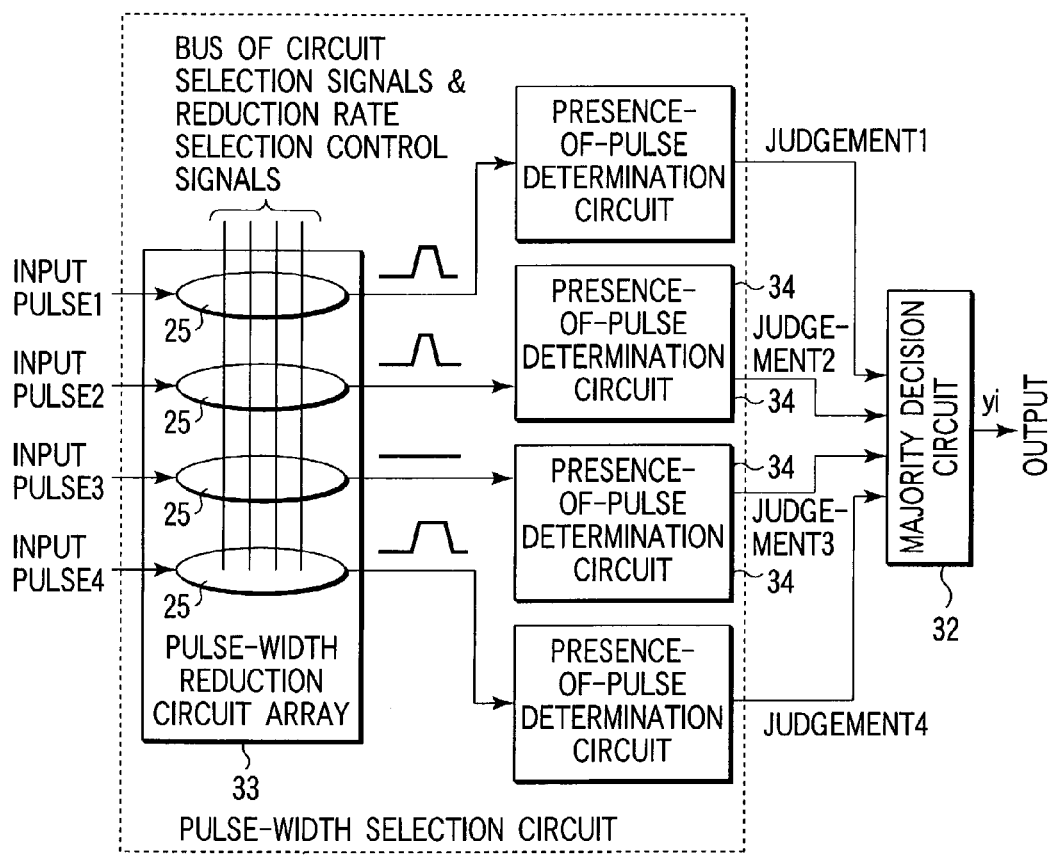

As shown in FIG. 5B, the pulse-width selection circuit 31 includes a pulse-width reduction circuit array 33 and presence-of-pulse determination circuits 34. In the pulse-width reduction circuit array 33, for example, the pulse-width reduction circuits 25 one of which is shown in FIG. 3E are respectively provided for the input pulses 1, 2, 3, 4. The pulse-width reduction circuits 25 are arranged in an array form in the pulse-width reduction circuit array 33, for example. Buses of circuit selection signals and reduction rate selection control signals are arranged above the pulse-width reduction circuits 25 arranged in the array form. Reduction rate selection control signals which are used to respectively control the reduction rates of the pulse-width reduction circuits 25 are supplied from the reduction rate selection circuit 28 shown in FIG. 3E, for example, to the buses of circuit selection signals and reduction rate selection control signals.

If input pulses 1, 2, 3, 4 are input to the respective pulse-width reduction circuits 25, they are subjected to pulse-width reduction. Some of the pulses output from the pulse-width reduction circuits 25 may be extinguished. Whether the pulse is present or extinguished is determined by the presence-of-pulse determination circuit 34.

The presence-of-pulse determination circuits 34 corresponding in number to the pulse-width reduction circuits 25 are provided. In the present example, since four pulse-width reduction circuits 25 are provided, four presence-of-pulse determination circuits 34 are provided. Outputs of the four presence-of-pulse determination circuits 34 are judgments 1, 2, 3, 4. The presence-of-pulse determination circuit 34 is so configured that the judgment result output will become "1" when the pulse is present and the judgment result output will become "0" when the pulse is extinguished, for example.

The above presence-of-pulse determination circuit 34 is configured by a set-reset flip-flop or the like, for example.

The majority decision circuit 32 makes a majority decision to determine whether the judgment result output of "1" or "0" has a majority. For example, when "1" has a majority, the majority decision circuit 32 supplies an output (yi) of "1" and when "0" is in the majority, the majority decision circuit 32 supplies an output (yi) of "0".

The majority decision circuit 32 can be configured by a logic gate circuit if the number of inputs is small. However, if the number of inputs becomes larger, the number of logic gate circuits is rapidly increased and the circuit scale becomes larger. One circuit example of the majority decision circuit which can suppress an increase in the circuit scale is explained below.

Figure 6:
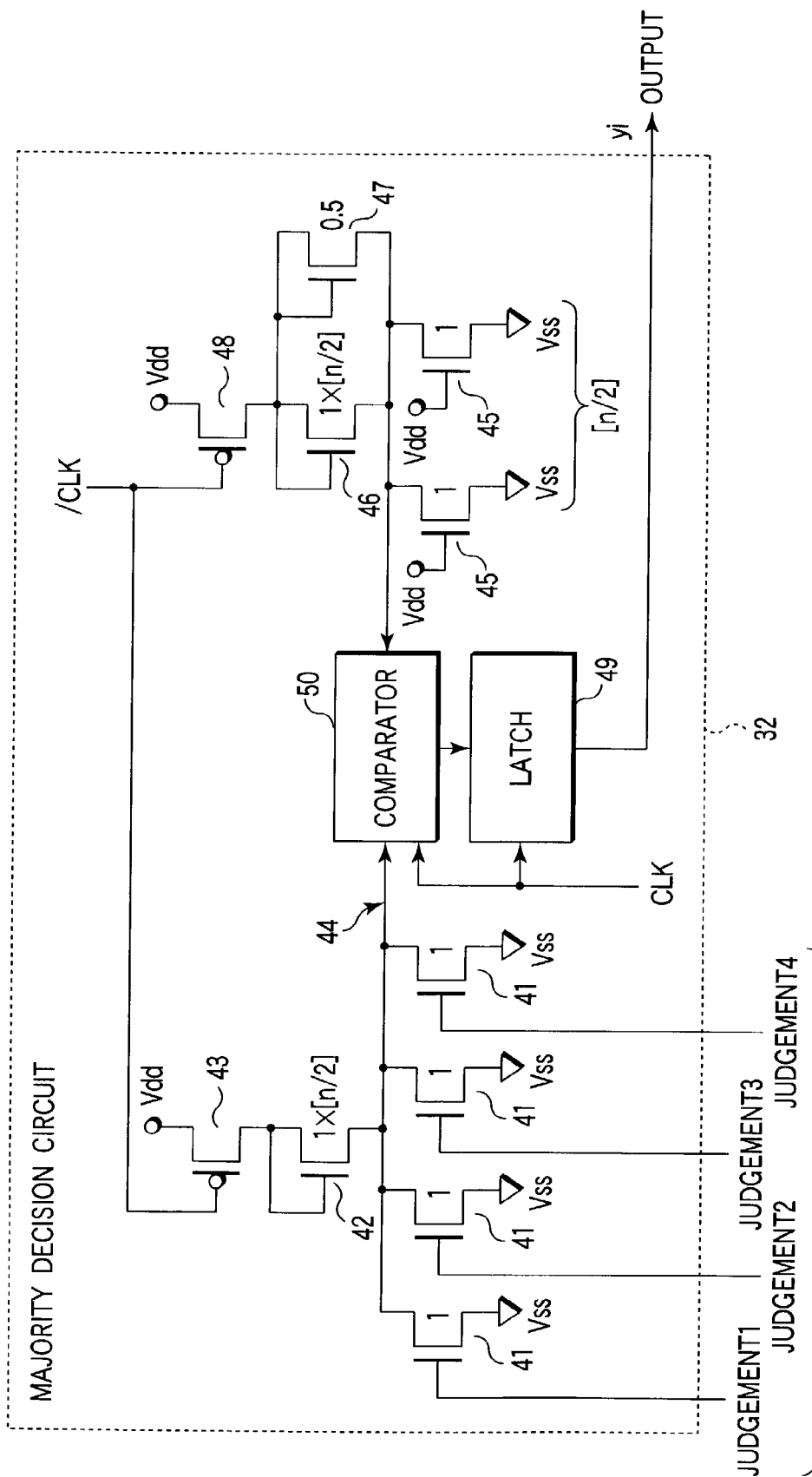
FIG. 6 is a circuit diagram showing one circuit example of a majority decision circuit.

FIG. 6 is a circuit diagram showing one circuit example of the majority decision circuit.

As shown in FIG. 6, in the majority decision circuit of one example, all of the n outputs of the pulse-width selection circuit 31, that is, all of the four outputs (judgments 1, 2, 3, 4) in the present example are individually received by N-channel transistors 41 having the same gate width dimension (the dimension is set as "1"). The transistors 41 are connected in parallel and commonly connected to an N-channel transistor (load) 42 whose gate width dimension is a maximum integral [n/2] multiple of the above gate width dimension which does not exceed a value obtained by dividing the number n of inputs by 2. The transistor (load) 42 is connected to a power supply Vdd via a power supply switch, for example, a P-channel transistor 43. When the power supply switch, for example, the transistor 43 is turned ON, a corresponding level determined according to the number of "1" levels of the inputs (judgments 1, 2, 3, 4) occurs on the common connection node 44 of the group of the transistors. A circuit portion on the right side in the drawing generates a reference level used to make a majority decision on the "1" level of the inputs (judgments 1, 2, 3, 4). The circuit portion includes n/2 N-channel transistors 45 each having the gate width dimension "1", an N-channel transistor (load) 46 having the gate width dimension "n/2" and an N-channel transistor (load) 47 connected in parallel with the transistor (load) 46 and having the gate width dimension "0.5". The transistors (loads) 46, 47 are connected to the power supply Vdd via a power supply switch, for example, a P-channel transistor 48. The transistor 47 is a weighting circuit which determines one of "1" and "0" so as not to make the judgment result of majority decision indefinite when the number n of the inputs is even and the numbers of "0" and "1" are equal to each other. In this example, when the numbers of "0" and "1" are equal to each other, the design is made so as not to regard "1" as the majority, for example.

In FIG. 6, outputs from the transistor groups on the right and left sides are input to and compared by a comparator 50. The comparison result is held in a latch circuit 49 at the timing of a clock CLK. If the output level of the transistor group on the left side in FIG. 6 is lower than the reference level of the transistor group on the right side in FIG. 6, "1" is determined as a majority and the output (yi) is set to "1". On the other hand, if the output level of the transistor group on the left side in FIG. 6 is higher than the reference level of the transistor group on the right side in FIG. 6, "0" is determined as a majority and the output (yi) is set to "0".

In the majority decision circuit 32 of the present example, the power supply switches, for example, the transistors 43, 48 are provided with respect to the loads, for example, the transistors 42, 46, 47. The transistors 43, 48 are controlled by a clock /CLK which is complementary to the clock CLK and the transistors 43, 48 are turned ON when the comparator 50 is operated. The reason why the power supply switches, for example, the transistors 43, 48 are turned ON when the comparator 50 is operated is that the majority decision circuit 32 of the present example is basically of a current penetration type. For example, by turning ON the power supply switches only when the comparator 50 is operated, it becomes possible to suppress the power consumption of the current penetration type majority decision circuit 32.

FIG. 7 is a block diagram showing an example of the configuration of the feature extracting circuit block NF using the circuit blocks nfi.

As shown in FIG. 7, the circuit blocks nfi (i=0, 1, 2, ...) commonly receive input vectors P and supply outputs yi (i=0, 1, 2, ...) as the outputs of the respective majority decision circuits 32. Each of the pulse-width selection circuits 31 shown in FIG. 7 extracts a constant feature which is finally subjected to the pulse-width selection process, for example, the pulse-width reduction rate adjusting process from the fuzzy information input vectors X. In this state, semiconductor integrated circuit devices having a large amount of equal characteristics can be produced as feature extraction systems, for example.

Figure 8:
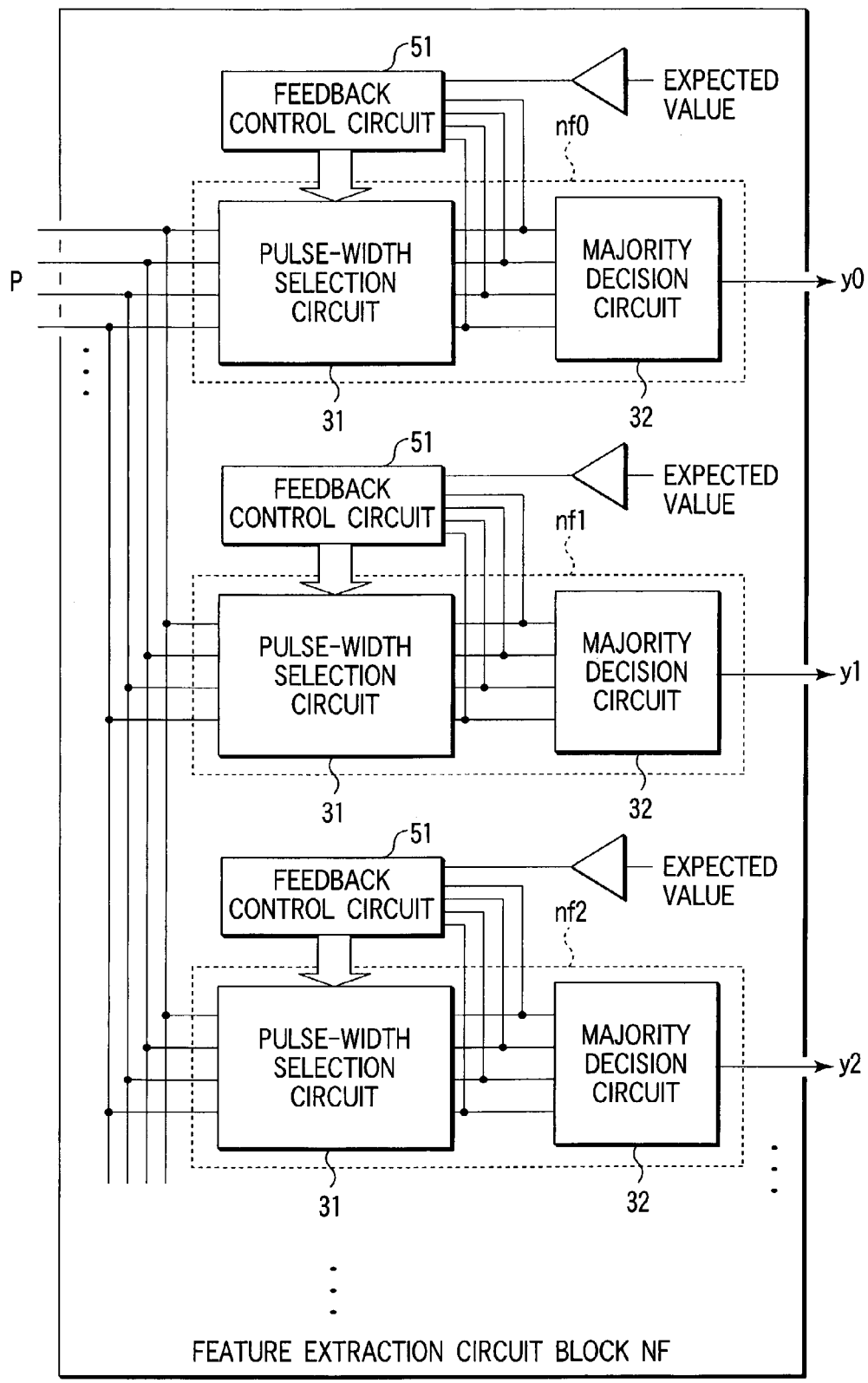
FIG. 8 is a block diagram showing an example of the configuration of the feature extraction circuit block NF having a learning function.

In order to perform the pulse-width selection process, for example, the pulse-width reduction rate adjusting process, it is necessary to cause the feature extraction system to perform learning. FIG. 8 shows an example of the configuration of the feature extracting circuit block NF having a learning function.

In order to permit the feature extracting circuit block NF to extract the features of the fuzzy information input vectors X as expected and output feature information output vectors Y which express features obtained by adequately degenerating the fuzzy information input vectors X, it is only required to perform the pulse-width selection process, for example, the pulse-width reduction rate adjusting process in the pulse-width selection circuit 31 so as to output the feature information output vectors Y as expected. In order to serve the above purpose, for example, the fuzzy information input vectors X are supplied to the feature extraction system and the respective pulse-width selection circuits 31 are adjusted so as to cause the respective circuit blocks nfi to output the components of the feature information output vectors Y which are expected with respect to the fuzzy information input vectors.

At this time, for example, as shown in FIG. 8, expected values are respectively input to feedback control circuits 51 each of which in turn compares the input expected value with the judgments 1, 2, 3, 4 which are outputs to the majority decision circuit 32 from the pulse-width selection circuit 31. Then, for example, the reduction rate selection circuit 28 is controlled to switch the ON/OFF positions of the switches 27 and adjust the output port of the pulse according to the result of comparison between the expected value and the actual outputs of the presence-of-pulse determination circuits 34. The above adjusting operation is completed for the circuit block nfi in which the output of the majority decision circuit 32 coincides with the expected value and the above adjusting operation is continuously performed only for the circuit block nfi in which the output thereof does not coincide with the expected value. When the adjusting operation is terminated for all of the circuit blocks nfi, the adjusting process for one fuzzy information input vector X is terminated and the adjusting process for a next fuzzy information input vector X is started.

The feature extraction system comes to have a function of extracting the feature by performing the adjusting process, that is, the learning process for a series of fuzzy information input vectors X, and when a fuzzy information input vector X is input, a feature information output vector Y which is the feature of the input fuzzy information input vector is output. An example of the more specific adjusting mechanism of the pulse-width selection circuit 32 is shown in FIG. 9.

As shown in FIG. 9, the expected value which is the output of the majority decision circuit 32 and the actual output of the presence-of-pulse determination circuit 34 are compared in the feedback control circuit 51. In the circuit block nfi which supplies an output yi different from the expected value, the feedback control circuit 51 is activated. If the output of the presence-of-pulse determination circuit 34 is "1" when the expected value is "0", the feedback control circuit 51 outputs a signal "INCRE" to the reduction rate selection circuit 28 to switch the ON/OFF positions of the switches 27 so as to increase the number of delay elements 26 through which the pulse of the pulse-width reduction circuit 25 passes. Further, if the output of the presence-of-pulse determination circuit 34 is "0" when the expected value is "1", the feedback control circuit 51 outputs a signal "DECRE" to the reduction rate selection circuit 28 to switch the ON/OFF positions of the switches 27 so as to decrease the number of delay elements 26 through which the pulse of the pulse-width reduction circuit 25 passes. If the expected value and the output of the presence-of-pulse determination circuit 34 coincide with each other, no operation is performed.

By performing the above control operation, the adjusting process is performed to increase the number of delay elements 26 of the pulse-width reduction circuit 25 when the expected value is "0". As a result, the number of pulse-width reduction circuits 25 in which the pulse is extinguished is increased and the output of the majority decision circuit 32 tends to become "0". Further, the adjusting process is performed to decrease the number of delay elements 26 of the pulse-width reduction circuit 25 when the expected value is "1". As a result, the number of pulse-width reduction circuits 25 in which the pulse is extinguished is reduced and the output of the majority decision circuit 32 tends to become "1".

Next, one circuit example of the feedback control circuit 51 and one circuit example of the reduction rate selection circuit 28 are explained.

Figure 10:
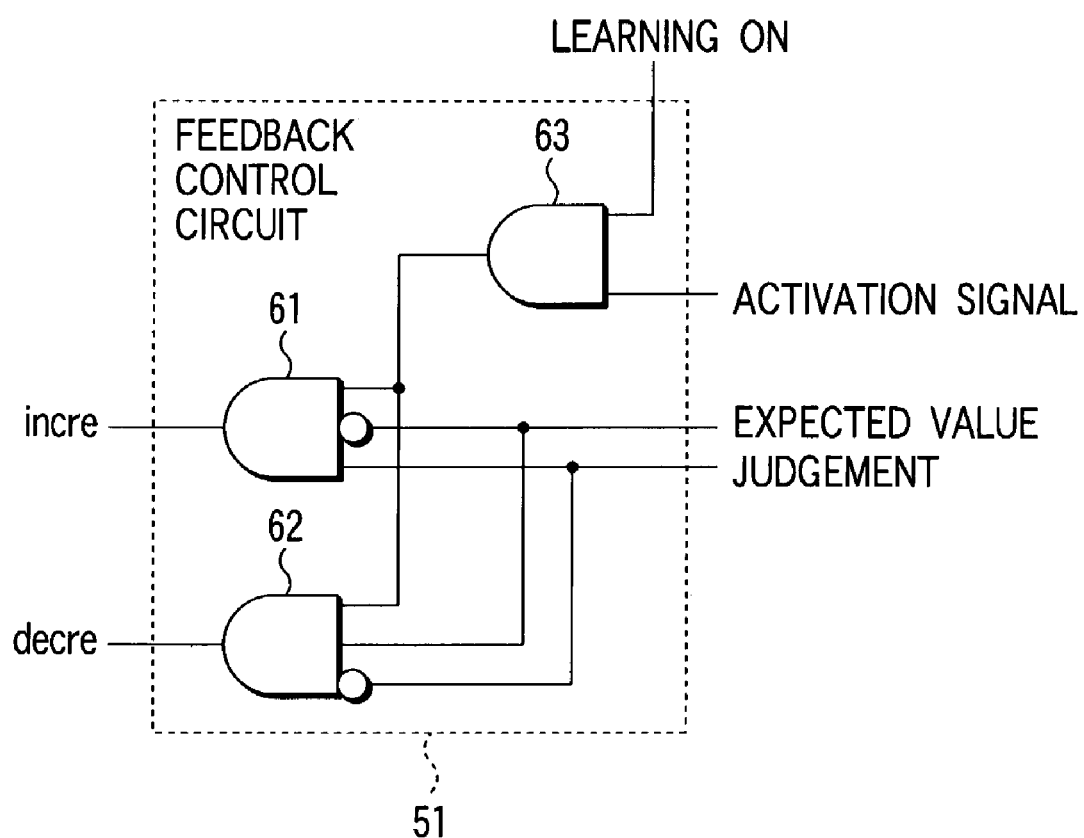
FIG. 10 is a circuit diagram showing one circuit example of a feedback control circuit.

FIG. 10 is a circuit diagram showing one circuit example of the feedback control circuit 51.

As shown in FIG. 10, the feedback control circuit 51 of one circuit example includes a logic gate circuit, for example, an AND gate circuit 61 which outputs a signal "INCRE", a logic gate circuit, for example, an AND gate circuit 62 which outputs a signal "DECRE", and a logic gate circuit, for example, an AND gate circuit 63 which activates the AND gate circuits 61, 62. The AND gate circuit 63 receives a signal "activation" and a signal "learning ON". When the signal "activation" and signal "learning ON" are both set at "1", the AND gate circuit 63 activates the AND gate circuits 61, 62.

The activated AND gate circuit 61 outputs a signal "INCRE" of "1" level when the expected value is "0" and the output of the presence-of-pulse determination circuit is "1".

Further, the activated AND gate circuit 62 outputs a signal "DECRE" of "1" level when the expected value is "1" and the output of the presence-of-pulse determination circuit is "0".

The AND gate circuit 63 is not always necessary. For example, when the signal "learning ON" is not required, it is possible to directly input the signal "activation" to the AND gate circuits 61, 62.

A case wherein the signal "learning ON" is not required appears when the adjusting operation in the pulse-width selection process, for example, the pulse-width reduction rate adjusting process is performed in the production factory, for example, and the learning process is terminated in the production factory. In this case, after termination of the learning process, a system obtained by fixing each of the switches 27 and removing the feedback control circuit 51 is shipped as the feature extraction system as shown in FIG. 7.

Further, a case wherein the signal "learning ON" is required appears when the learning process or re-learning process is performed in the market. In this case, the feedback control circuit 51 is left behind in the product, for example.

FIG. 11 is a block diagram showing an example of the configuration of the reduction rate control circuit 28.

As shown in FIG. 11, the reduction rate control circuit 28 includes a shift register 71 which can shift a signal in either a direction toward the right side in FIG. 11 (which is hereinafter referred to as an "INCRE" direction) or a direction toward the left side in FIG. 11 (which is hereinafter referred to as a "DECRE" direction). The shift register 71 includes a plurality of registers 72, in this example, three registers 72-1 to 72-3.

An output i of the register 72-1 is supplied to the second input terminal of an XOR gate circuit (coincidence/non-coincidence judgment circuit) 73-1, the first input terminal of an XOR gate circuit (coincidence/non-coincidence judgment circuit) 73-2 and the register 72-2. The first input terminal of the XOR gate circuit 73-1 is connected to a high-potential power supply Vdd or a low-potential power supply Vss and the input level thereof is fixed. In this example, it is connected to the high-potential power supply Vdd, for example, and the input level thereof is fixed at "1".

An output (i+1) of the register 72-2 is supplied to the second input terminal of the XOR gate circuit 73-2, the first input terminal of an XOR gate circuit (coincidence/non-coincidence judgment circuit) 73-3 and the register 72-3. Further, the complementary output /(i+1) of the register 72-2 is supplied to the register 72-1.

An output (i+2) of the register 72-3 is supplied to the second input terminal of the XOR gate circuit 73-3 and the first input terminal of an XOR gate circuit (coincidence/non-coincidence judgment circuit) 73-4. The second input terminal of the XOR gate circuit 73-4 is connected to the low-potential power supply Vss or high-potential power supply Vdd and the input level thereof is fixed. In this example, it is connected to the low-potential power supply Vss, for example, and the input level thereof is fixed at "0". Further, the complementary output /(i+2) of the register 72-3 is supplied to the register 72-2.

The reduction rate selection circuit 28 of the present configuration example detects the boundary between the "0" level and the "1" level of the outputs (i−1), i, (i+1), (i+2), (i+3), that is, the non-coincidence point by use of the XOR gate circuits 73-1 to 73-4. Then, one of the reduction rate selection control signals SW1 to SW4 which corresponds to the non-coincidence point is set to the "1" level and one of the switches 27 (for example, N-channel transistors) is turned ON to determine the output port of the pulse. In this example, when the signal SW1 is set at the "1" level, the reduction rate becomes minimum, then the reduction rate is gradually increased as the signals SW2, SW3 are sequentially set to the "1" level, and when the signal SW4 is set at the "1" level, the reduction rate becomes maximum.

When the signal "INCRE" is "1", the shift register 71 sequentially shifts the position of the "1" level in the "INCRE" direction, for example, in a direction of the outputs i, (i+1), (i+2) in response to "HIGH/LOW" of a shift clock shiftCLK. As a result, the position of the non-coincidence point is shifted one by one in a direction of the XOR gate circuits 73-1 to 73-4 and the reduction rate selection control signal which is set at the "1" level is shifted one by one in a direction of SW1 to SW4.

When the signal "DECRE" is "1", the shift register 71 sequentially shifts the position of the "1" level in the "DECRE" direction, for example, in a direction of the outputs (i+2), (i+1), i in response to "HIGH/LOW" of the shift clock shiftCLK. As a result, the position of the non-coincidence point is shifted one by one in a direction of the XOR gate circuits 73-4 to 73-1 and the reduction rate selection control signal which is set at the "1" level is shifted one by one in a direction of SW4 to SW1.

Figure 12:
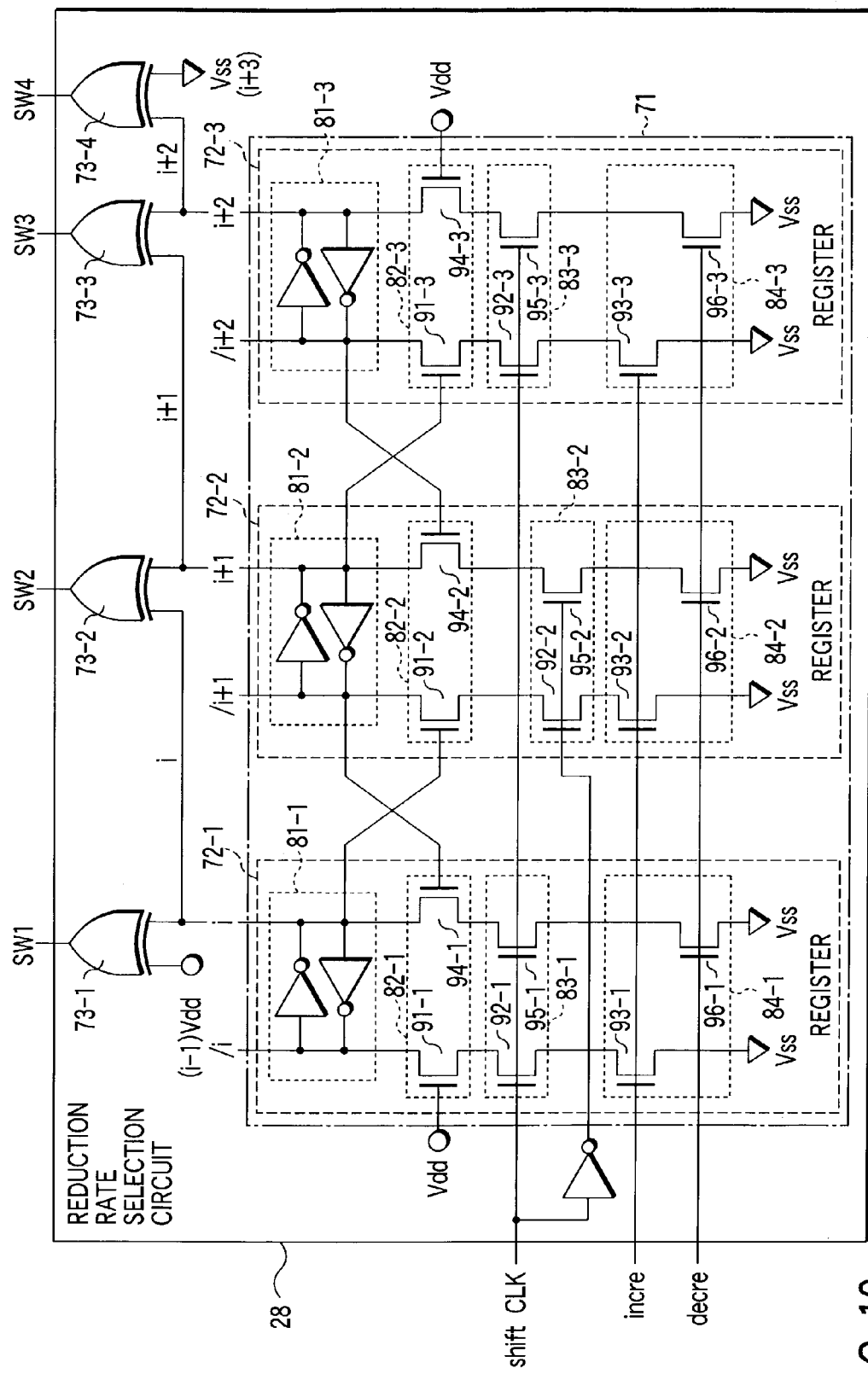
FIG. 12 is a circuit diagram showing one circuit example of the reduction rate control circuit.

FIG. 12 is a circuit diagram showing one circuit example of the reduction rate selection circuit shown in FIG. 11. In FIG. 12, particularly, one circuit example of the register 72 shown in FIG. 11 is shown.

As shown in FIG. 12, the register 72 (72-1 to 72-3) includes a latch circuit 81, shift enable circuit 82, register enable circuit 83 and latch data rewriting circuit 84, for example.

The latch circuit 81 latches data "0" or data "1".

The shift enable circuit 82 enables the register 72 to perform the data shifting operation.

The register enable circuit 83 enables the register 72 in response to "HIGH/LOW" of the shift clock shiftCLK. For example, the registers 72 (72-1, 72-3) which are enabled when the shift clock shiftCLK is "HIGH" and the registers 72 (72-2) which are enabled when the shift clock shiftCLK is "LOW" are alternately arranged.

The latch data rewriting circuit 84 sets up a state in which data latched in the latch circuit 81 can be rewritten according to the signal "INCRE" and signal "DECRE". The latch data rewriting circuit 84 of the present example sets up a rewritable state so as to set the output i, (i+1) or (i+2) to the "1" level, for example, when the signal "INCRE" is set at the "1" level. Further, it sets up a rewritable state so as to set the output i, (i+1) or (i+2) to the "0" level, for example, when the signal "DECRE" is set at the "1" level.

Next, one example of the operation of the reduction rate selection circuit shown in FIG. 12 is explained.

Figure 13B:
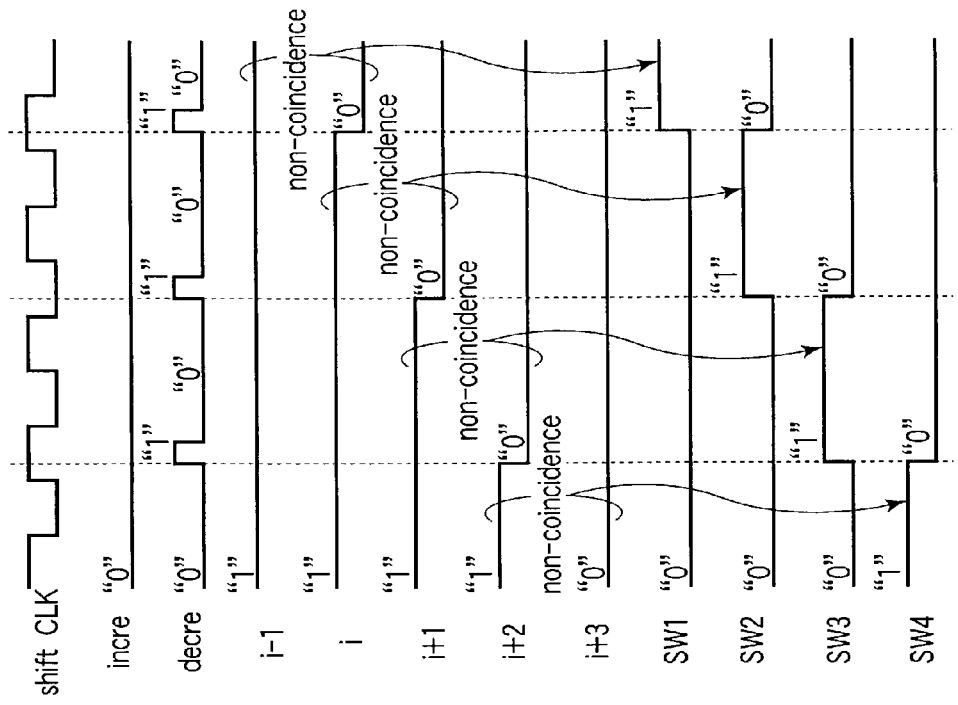
FIG. 13A is an operation waveform diagram for illustrating the reduction rate increasing operation of the reduction rate control circuit and FIG. 13B is an operation waveform diagram for illustrating the reduction rate decreasing operation of the reduction rate control circuit.
Figure 13A:
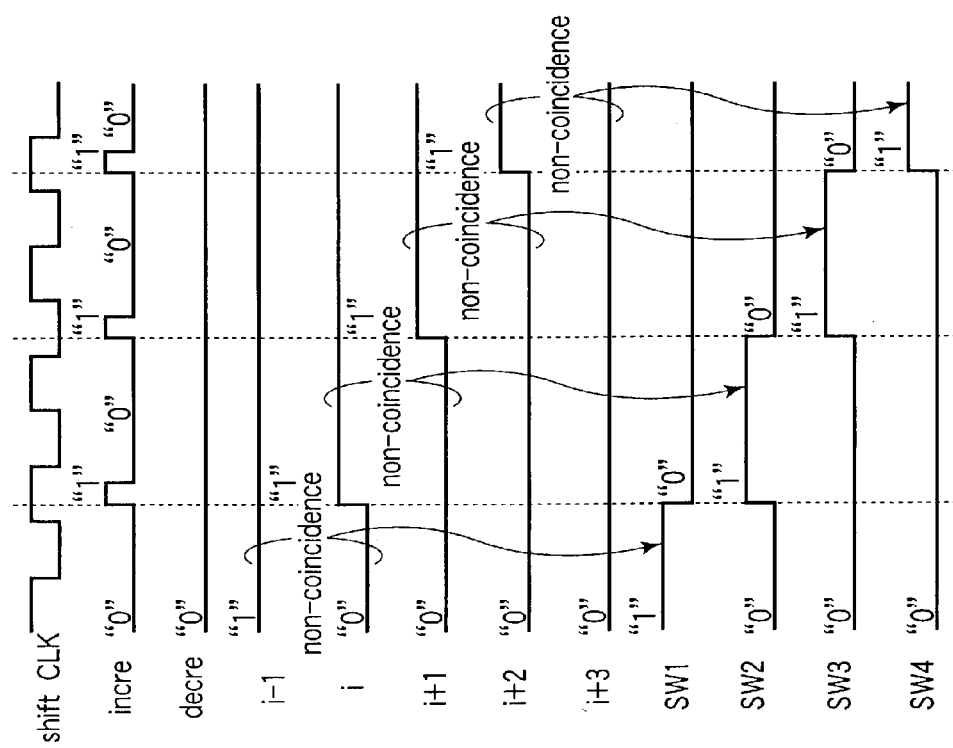

FIG. 13A is an operation waveform diagram for illustrating the reduction rate increasing operation of the reduction rate selection circuit shown in FIG. 12 and FIG. 13B is an operation waveform diagram for illustrating the reduction rate decreasing operation of the reduction rate selection circuit shown in FIG. 12.

[Reduction Rate Increasing Operation]

As shown in FIG. 13A, in the initial condition, it is assumed that data which causes the outputs i, (i+1), (i+2) to be set to the "0" level is written in the latch circuits 81-1 to 81-3, for example. In this case, the output (i−1) is fixed at the "1" level and the output (i+3) is fixed at the "0" level. The position of the non-coincidence point in the initial condition lies between the output (i−1) and the output i, that is, in the position of the XOR gate circuit 73-1. Therefore, the signal SW1 is set at the "1" level.

Then, the signal "INCRE" is set from the "0" level to the "1" level when the shift clock shiftCLK is "HIGH". At this time, the complementary output /i of the latch circuit 81-1 shown in FIG. 12 is coupled to the low-potential power supply Vss via N-channel transistors 91-1, 92-1, 93-1 and the output i of the latch circuit 81-1 is rewritten to the "1" level from the "0" level. As a result, the position of the non-coincidence point is shifted from the XOR gate circuit 73-1 to the position of the XOR gate circuit 73-2 and the signal SW2 is set to the "1" level instead of the signal SW1.

Next, the signal "INCRE" is set from the "0" level to the "1" level when the shift clock shiftCLK is "LOW". At this time, the complementary output /(i+1) of the latch circuit 81-2 is coupled to the low-potential power supply Vss via N-channel transistors 91-2, 92-2, 93-2 and the output (i+1) of the latch circuit 81-2 is rewritten to the "1" level from the "0" level. As a result, the position of the non-coincidence point is shifted to the position of the XOR gate circuit 73-3 and the signal SW3 is set to the "1" level.

After this, the signal "INCRE" is set from the "0" level to the "1" level when the shift clock shiftCLK is "HIGH". At this time, the complementary output /(i+2) of the latch circuit 81-3 is coupled to the low-potential power supply Vss via N-channel transistors 91-3, 92-3, 93-3 and the output (i+2) of the latch circuit 81-3 is rewritten to the "1" level from the "0" level. As a result, the position of the non-coincidence point is shifted to the position of the XOR gate circuit 73-4 and the signal SW4 is set to the "1" level.

[Reduction Rate Decreasing Operation]

As shown in FIG. 13B, in the initial condition, it is assumed that data which causes the outputs i, (i+1), (i+2) to be set to the "1" level is written in the latch circuits 81-1 to 81-3, for example. In this case, the output (i−1) is fixed at the "1" level and the output (i+3) is fixed at the "0" level. The position of the non-coincidence point in the initial condition lies between the output (i+2) and the output (i+3), that is, in the position of the XOR gate circuit 73-4. Therefore, the signal SW4 is set at the "1" level.

Then, the signal "DECRE" is set from the "0" level to the "1" level when the shift clock shiftCLK is "HIGH". At this time, the output (i+2) of the latch circuit 81-3 is coupled to the low-potential power supply Vss via N-channel transistors 94-3, 95-3, 96-3 and the output (i+2) of the latch circuit 81-3 is set to the "0" level from the "1" level. As a result, the position of the non-coincidence point is shifted from the XOR gate circuit 73-4 to the position of the XOR gate circuit 73-3 and the signal SW3 is rewritten to the "1" level instead of the signal SW4.

Next, the signal "DECRE" is set from the "0" level to the "1" level when the shift clock shiftCLK is "LOW". At this time, the output (i+1) of the latch circuit 81-2 is coupled to the low-potential power supply Vss via N-channel transistors 94-2, 95-2, 96-2 and the output (i+1) of the latch circuit 81-2 is rewritten to the "0" level from the "1" level. As a result, the position of the non-coincidence point is shifted to the position of the XOR gate circuit 73-2 and the signal SW2 is set to the "1" level.

After this, the signal "DECRE" is set from the "0" level to the "1" level when the shift clock shiftCLK is "HIGH". At this time, the output i of the latch circuit 81-1 is coupled to the low-potential power supply Vss via N-channel transistors 94-1, 95-1, 96-1 and the output i of the latch circuit 81-1 is rewritten to the "0" level from the "1" level. As a result, the position of the non-coincidence point is shifted to the position of the XOR gate circuit 73-1 and the signal SW1 is set to the "1" level.

The feature extraction system according to the first embodiment receives a plurality of pulse vectors P and selects the plurality of pulse vectors P by using the preset pulse width as a reference. For example, the plurality of pulse vectors P are selected by extinguishing the pulse vectors P whose pulse width is shorter than the preset pulse width and permitting the other pulse vectors P to pass through. Then, feature information vectors Y which express the features of fuzzy information input vectors X are degenerated and extracted from the fuzzy information input vectors X according to the number of selected pulse vectors P for the respective feature information vectors Y0, Y1, Y2, . . . , for example. Further, in this example, feature information vectors Y which express the features of fuzzy information input vectors X extracted from the fuzzy information input vectors X are output as digital information in which a case wherein the presence of the pulse is in the majority is set to "1" and a case wherein the absence of the pulse is in the majority is set to "0", for example, by making a majority decision on the number of the selected pulse vectors P, for example.

If feature information is contained in fuzzy information, the feature extraction system according to the first embodiment can extract the feature information by use of a simple method for selecting a plurality of pulse vectors P by using preset pulse width as a reference.

According to the feature extraction system of the first embodiment, when some fuzzy information items in which the feature cannot be determined because detail information items thereof are different from one another are given, it is possible to determine whether or not the fuzzy information items have the same feature information without using a complicated software, for example. Therefore, it is advantageous in enhancing the operation speed of the information process, for example.

Further, in comparison with the neurosystem, it is possible to reduce the number of analog elements such as resistors or eliminate them, for example, and it is advantageous in lowering the power consumption and making the system small.

The feature extraction system according to the first embodiment can be configured as a semiconductor integrated circuit device. In this case, as circuits integrated in the semiconductor chip, for example, the amplitude-pulse-width converter circuit array 12, feature extraction circuit block NF, output buffer 14 and the like can be provided.

The analog sensor receiver array 11 can be integrated in the semiconductor chip and it can also be provided as an externally connected device. If fuzzy information is a signal of radio waves, light or the like, for example, the analog sensor receiver array 11 is formed as an externally connected device in some cases.

Further, if fuzzy information is an electrical signal or the like, the analog sensor receiver array 11 is integrated in a semiconductor chip in some cases.

In addition, if fuzzy information contains measurable input physical quantities, the analog sensor receiver array 11 can be omitted. In this case, fuzzy information is directly input to the amplitude-pulse-width converter circuit array 12.

SECOND EMBODIMENT

In the feature extraction system according to the first embodiment, inputs are formed of vectors containing a large number of components, but it can also be applied to a single signal. One example of this case is explained as a second embodiment below.

Figure 14:
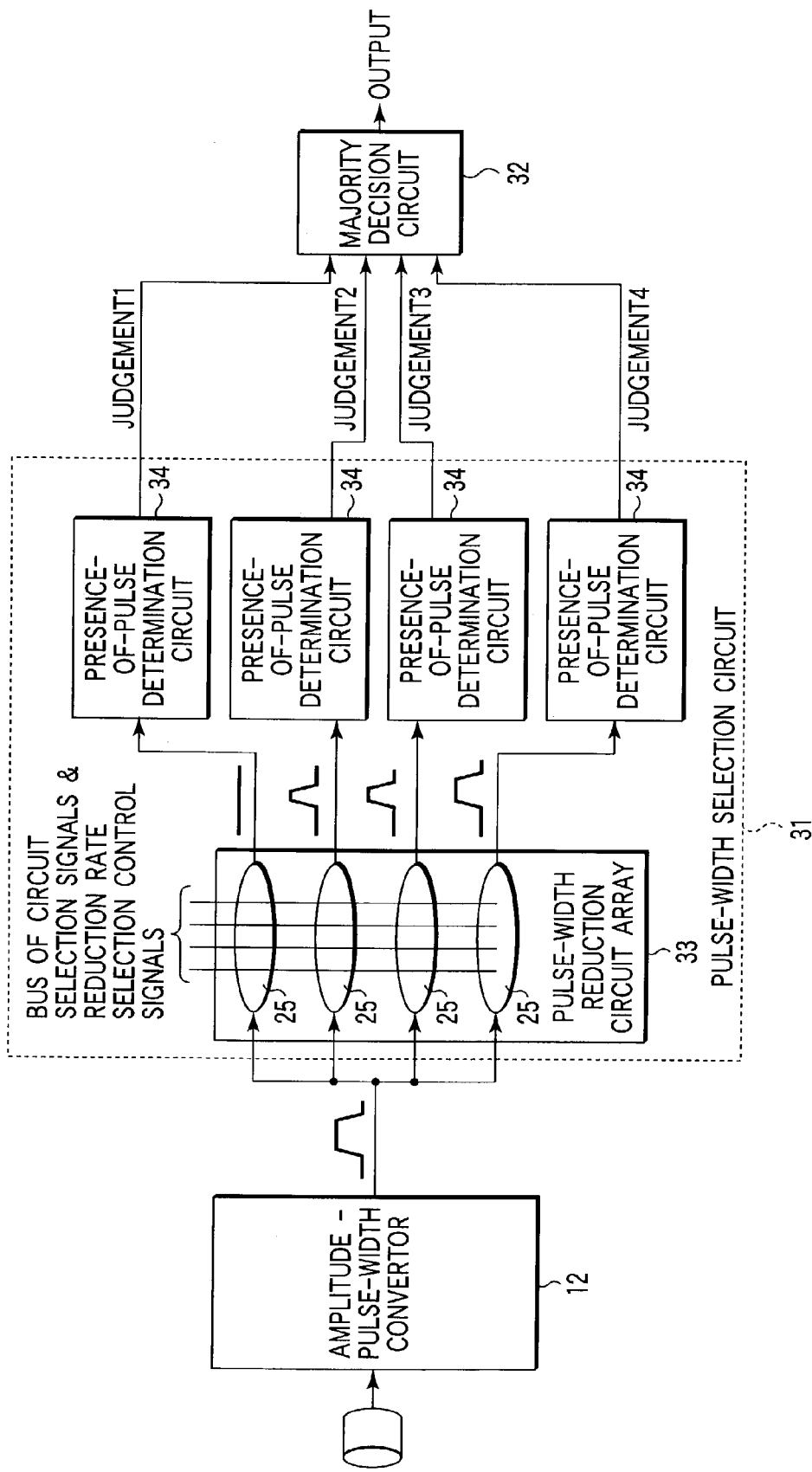
FIG. 14 is a block diagram showing a feature extraction system according to a second embodiment of the present invention.

FIG. 14 is a block diagram showing a feature extracting system according to a second embodiment of the present invention.

The feature extraction system shown in FIG. 14 is a system which can be used when it is desired to more precisely set a threshold value of a sensor receiver 11. A signal from the sensor receiver 11 is converted into information with corresponding pulse width by an amplitude-pulse-width converter circuit array 12 and input to a pulse-width reduction circuit array 33. It is possible to use only one pulse-width reduction circuit, but in this case, judgment of existence of a pulse becomes ambiguous and unstable when the pulse is about to be extinguished. Therefore, when judgment becomes ambiguous, a majority decision circuit 32 is used to make a majority decision so as to make a clear judgment. Buses of circuit selection signals and reduction rate selection control signals are previously wired in the pulse-width reduction circuit array 33 for adjustment of settings at this time. If the set value of extinction of the pulse width of the pulse-width reduction circuit 25 is previously set near the threshold value within a small width range, it becomes possible to more stably attain a transition region of judgment of a signal from the sensor receiver 12.

THIRD EMBODIMENT

As another example of the pulse-width reduction circuit 25 and a system using the pulse-width reduction circuit 25, a system which selects and removes minute pulses or so-called whisker-like pulses contained as noise in an input signal is provided. One example of the system is explained as a third embodiment below.

Figure 15:
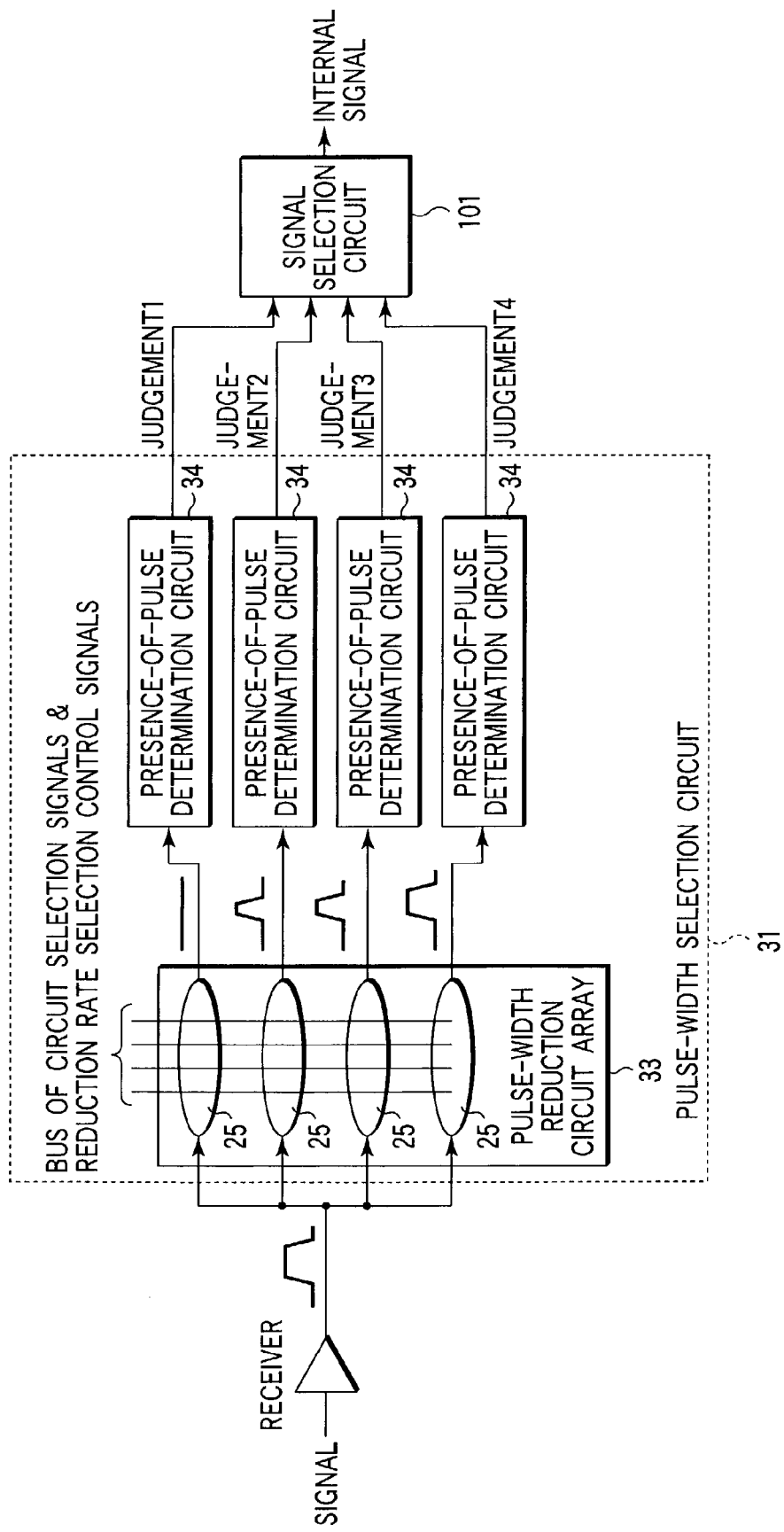
FIG. 15 is a block diagram showing a noise reduction system according to a third embodiment of the present invention.

FIG. 15 is a block diagram showing a noise reduction system according to a third embodiment of the present invention.

As shown in FIG. 15, a signal input to the system contains noise which is meaningless as the signal. A pulse-width reduction circuit 25 is used to remove or reduce the noise. In order to determine a pulse with a certain pulse width or less pulse width as noise, various settings are made in a pulse-width reduction circuit array 33 and outputs of the pulse-width reduction circuit array 33 are subjected to the pulse existence judgment process. If the pulse is determined as noise, settings are made to extinguish the pulse. A signal selection circuit 101 which is used to select one of the presence-of-pulse determination circuits 34 is provided. If a pulse is detected, an internal signal is generated at this time point to determine that the signal has been received. If a time margin is provided until the internal signal is created from the signal, the majority decision circuit 32 shown in FIG. 14 can be used to determine whether the pulse is a signal or noise.

FOURTH EMBODIMENT

As still another application, a system which suppresses the power consumption in an intelligent fashion can be provided by forming the system on semiconductor, for example, silicon. The system formed on semiconductor, for example, silicon is configured by various functional circuit blocks. The functional circuit blocks are adequately selected according to an input command and a plurality of functional circuit blocks are caused to function by a control circuit so as to perform a certain operation. If the device is further miniaturized and the circuit scale becomes larger, the total sum of off-leak currents of transistors which configure the above functional circuit blocks becomes large. Particularly, when an attempt is made to enhance the operation speed, the off-leak current becomes larger since the driving ability of the transistor is enhanced. Therefore, the total sum of off-leak currents of the functional circuit blocks which are not operated also becomes large and the ratio thereof with respect to the total operation current of the system becomes high.

Therefore, it becomes important from the viewpoint of power management that the functional circuit blocks which are not operated are separated from the power supply for each input command to suppress the off-leak currents. One example thereof is explained as a fourth embodiment below.

FIG. 16 is a block diagram showing a system LSI with power management function according to a fourth embodiment of the present invention. In FIG. 16, only basic block portions are shown.

As shown in FIG. 16, the system LSI according to the fourth embodiment includes a plurality of functional circuit blocks 110-0 to 110-n.

An input command X is input to a control circuit 111. The control circuit 111 receives the input command X, selects at least one of the functional circuit blocks 110-0 to 110-n according to the input command X and causes the selected functional circuit block to function.

Further, the input command X is also input to a feature extraction circuit block NF. The feature extraction circuit block NF receives the input command X and extracts the features of the input command X. In this example, for example, the input command X is input to a plurality of circuit blocks nf0 to nfn. The circuit blocks nf0 to nfn respectively output extracted features Y (y0 to yn). The feature Y is a vector obtained as the result of feature extraction, for example.

The extracted feature Y is input to a power management circuit 112. In this example, as the power management circuit 112, a plurality of power management circuits 112 are provided for the respective functional circuit blocks 110-0 to 110-n, for example. A plurality of power management circuits 112-0 to 112-n suppress the power consumption of the non-selected functional circuit blocks among the plurality of functional circuit blocks 110-0 to 110-n based on the extracted features Y (y0 to yn). The power management circuits 112-0 to 112-n of this example respectively include N-channel transistors 113-0 to 113-n connected between a low-potential power supply, for example, a ground potential node Vss and the functional circuit blocks 110-0 to 110-n. The power management circuits 112-0 to 112-n function to connect the functional circuit blocks which require supply of the power supply voltage, for example, the selected functional circuit blocks to the ground potential node Vss based on the extracted features Y (y0 to yn) and thus connect the selected functional circuit blocks to the power supply. Further, the power management circuits 112-0 to 112-n function to disconnect the functional circuit blocks which do not require supply of the power supply voltage, for example, the non-selected functional circuit blocks from the ground potential node Vss and thus disconnect the non-selected functional circuit blocks from the power supply. For example, the power management circuits 112-0 to 112-n of the present example manage supply of the power supply voltage to the functional circuit blocks based on the thus extracted features Y (y0 to yn).

One example of the learning process of the system LSI with power management function according to the fourth embodiment is as follows.

For example, when each of the functional circuit blocks 110-0 to 110-n receives a command which specifies an operation, an operation specifying signal is generated from a decoder section provided in each of the functional circuit blocks 110-0 to 110-n, for example. In one example of the learning process, the operation specifying signal is used as an expected value. To serve the above purpose, the decoder sections of the functional circuit blocks 110-0 to 110-n are always kept in the standby mode. The feature extraction circuit block NF is caused to perform learning with respect to the respective expected values in response to the input command X so that an output Y which coincides with the expected value will be generated, for example. After the end of the learning process, it is possible to previously set the required functional circuit blocks in the conductive state when a command is received and before the command causes the operation of each of the functional circuit blocks 110-0 to 110-n to start.

The learning process and feature extraction process cannot be perfectly performed with respect to all of the inputs in some cases. Therefore, since the required functional circuit blocks cannot be made conductive in some cases, it is advisable to make the functional circuit blocks 110-0 to 110-n conductive also by use of decoder outputs of the functional circuit blocks. However, in this case, it is necessary to provide a sufficient time margin in the whole operation of the system LSI. Therefore, when a miss occurs, the feature extraction circuit block NF may be caused to perform further learning so as to prevent occurrence of another miss.

Further, in the fourth embodiment, the system LSI is shown as an example, but this invention is not limited to the system LSI and can also be applied to a system configured on the circuit board, for example.

This invention has been explained by use of the first to fourth embodiments, but this invention is not limited to the above embodiments and can be variously modified without departing from the technical scope thereof.

For example, in the third and fourth embodiments, a case wherein the feature extraction system is used for noise reduction and power management is explained, but this invention is not limited to the above feature extraction systems. For example, this invention can also be applied to pattern recognition, data mining or the like.

Further, the above embodiments can be carried out in a single form, but it is also possible to adequately combine them and carry out them.

In addition, inventions of various stages are contained in the above embodiments and can be extracted by adequately combining a plurality of constituents disclosed in the above embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A feature extraction system comprising:
   a sensor which receives fuzzy information inputs containing a plurality of components and converts the plurality of components into a plurality of measurable input physical quantities,
   a converter which receives the plurality of input physical quantities and converts the input physical quantities into a plurality of pulses having pulse widths corresponding to magnitudes of the input physical quantities, and
   a feature extraction circuit which receives the plurality of pulses, selects the plurality of pulses by using a set pulse width as a reference, and extracts feature information expressing features of the fuzzy information inputs from the fuzzy information inputs according to the number of selected pulses.

2. The system according to claim 1, further comprising a feedback control section which changes the set pulse width based on an actual output value of said feature extraction circuit and an output expected value of said feature extraction circuit.

3. The system according to claim 2, wherein the actual output value and the output expected value are compared with each other, and when the actual output value and the output expected value are different from each other, a set value of the set pulse width is changed to make the actual output value equal to the output expected value by use of said feedback control section.

4. The system according to claim 2, wherein a set value of the set pulse width is changed to derive the same feature information output as a feature information output of the fuzzy information input from a different fuzzy information input which contains the same feature information as the aforementioned fuzzy information input and has a detail portion different from that of the aforementioned fuzzy information input by use of said feedback control section.

5. The system according to claim 2, further comprising a set value selecting circuit which selects the set value of the set pulse width.

6. The system according to claim 5, wherein the actual output value and the output expected value are compared with each other, when the actual output value and the output expected value are different from each other, a set value of the set pulse width is changed to make the actual output value equal to the output expected value by use of said feedback control section, and said set value selecting circuit is caused to learn the changed set value.

7. The system according to claim 5, wherein a set value of the set pulse width is changed to derive the same feature information output as a feature information output of the fuzzy information input from a different fuzzy information input which contains the same feature information as the aforementioned fuzzy information input and has a detail portion different from the aforementioned fuzzy information input by use of said feedback control section, and said set value selecting circuit is caused to learn the changed set value.

8. A feature extraction system comprising:
a sensor which receives fuzzy information inputs and converts the fuzzy information inputs into a plurality of measurable input physical quantities,
a converter which receives the input physical quantities and converts the input physical quantities into pulses having pulse widths corresponding to magnitudes of the input physical quantities, and
a feature extraction circuit which receives the pulses which are divided into plural groups, selects the plural groups of pulses by using a set pulse width as a reference, and extracts feature information expressing features of the fuzzy information inputs from the fuzzy information inputs according to the number of selected pulses.

9. The system according to claim 8, further comprising a feedback control section which changes the set pulse width based on an actual output value of said feature extraction circuit and an output expected value of said feature extraction circuit.

10. The system according to claim 9, wherein the actual output value and the output expected value are compared with each other, and when the actual output value and the output expected value are different from each other, a set value of the set pulse width is changed to make the actual output value equal to the output expected value by use of said feedback control section.

11. The system according to claim 9, wherein a set value of the set pulse width is changed to derive the same feature information output as a feature information output of the fuzzy information input from a different fuzzy information input which contains the same feature information as the aforementioned fuzzy information input and has a detail portion different from that of the aforementioned fuzzy information input by use of said feedback control section.

12. The system according to claim 9, further comprising a set value selecting circuit which selects the set value of the set pulse width.

13. The system according to claim 12, wherein the actual output value and the output expected value are compared with each other, when the actual output value and the output expected value are different from each other, a set value of the set pulse width is changed to make the actual output value equal to the output expected value by use of said feedback control section, and said set value selecting circuit is caused to learn the changed set value.

14. The system according to claim 12, wherein a set value of the set pulse width is changed to derive the same feature information output as a feature information output of the fuzzy information input from a different fuzzy information input which contains the same feature information as the aforementioned fuzzy information input and has a detail portion different from that of the aforementioned fuzzy information input by use of said feedback control section, and said set value selecting circuit is caused to learn the changed set value.

15. A semiconductor integrated circuit device comprising:
a converter circuit which receives fuzzy information inputs containing a plurality of measurable components and converts the plurality of components into a plurality of pulses having pulse widths corresponding to the magnitudes thereof, and
a feature extraction circuit which receives the plurality of pulses, selects the plurality of pulses by using a set pulse width as a reference, and extracts feature information expressing features of the fuzzy information inputs from the fuzzy information inputs according to the number of selected pulses.

16. The device according to claim 15, further comprising a feedback control circuit which changes the set pulse width based on an actual output value of said feature extraction circuit and an output expected value of said feature extraction circuit.

17. The device according to claim 15, wherein said feature extraction circuit includes a pulse-width selection circuit which receives the plurality of pulses and selects the plurality of pulses by using the set pulse width as a reference, and a majority decision circuit which makes a majority decision to determine whether the number of selected pulses has a majority or the number of non-selected pulses has a majority.

18. The device according to claim 17, wherein said pulse-width selection circuit includes a pulse-width reduction circuit which receives the plurality of pulses and reduces pulse widths of the plurality of pulses.

19. The device according to claim 17, wherein said pulse-width reduction circuit includes plural stages of delay elements, and a switching circuit which switches outputs of said plural stages of delay elements.

20. The device according to claim 19, wherein each of said plural stages of delay elements includes an inverter circuit configured by transistors whose gates respectively contain circuit elements which each have a capacitor and a resistor connected in parallel.

21. The device according to claim 20, wherein the gate of said transistor includes a first conductive layer and a second conductive layer and has a capacitive component and a resistive component on an interface between said first and second conductive layers.

22. The device according to claim 21, wherein said first conductive layer is a conductive polysilicon layer, said second conductive layer is a metal layer and said capacitive component and resistive component are obtained by use of an insulating layer existing on the interface between said conductive polysilicon layer and said metal layer.

23. The device according to claim 17, wherein said majority decision circuit includes a weighting circuit which decides which one of the number of selected pulses and the number of non-selected pulses has a majority when the number of selected pulses is equal to the number of non-selected pulses.

24. The device according to claim 15, wherein said feature extraction circuit includes a pulse-width reduction circuit which receives the plurality of pulses and reduces the pulse widths of the plurality of pulses, a presence-of-pulse determination circuit which receives an output of said pulse-width reduction circuit to judge whether a pulse exists or not, and a majority decision circuit which receives an output of said presence-of-pulse determination circuit and makes a majority decision to determine whether the presence or absence of the pulses has a majority.

25. The device according to claim 24, further comprising a feedback control circuit which changes the pulse-width reduction rate of said pulse-width reduction circuit based on an actual output value of said majority decision circuit and an output expected value of said majority decision circuit.

26. The device according to claim 25, wherein the actual output value and the output expected value are compared with each other, and when the actual output value and the output expected value are different from each other, the pulse-width reduction rate of said pulse-width reduction circuit is changed to make the actual output value equal to the output expected value by use of said feedback control circuit.

27. The device according to claim 25, wherein the pulse-width reduction rate of said pulse-width reduction circuit is changed to derive the same feature information output as a feature information output of the fuzzy information input from a different fuzzy information input which contains the same feature information as the aforementioned fuzzy information input and has a detail portion different from that of the aforementioned fuzzy information input by use of said feedback control circuit.

28. The device according to claim 25, further comprising a reduction rate selection circuit which selects the pulse-width reduction rate of said pulse-width reduction circuit.

29. The device according to claim 28, wherein the actual output value and the output expected value are compared with each other, when the actual output value and the output expected value are different from each other, the pulse-width reduction rate of said pulse-width reduction circuit is changed to make the actual output value equal to the output expected value by use of said feedback control circuit, and said pulse-width reduction circuit is caused to learn the changed pulse-width reduction rate.

30. The device according to claim 28, wherein the pulse-width reduction rate of said pulse-width reduction circuit is changed to derive the same feature information output as a feature information output of the fuzzy information input from a different fuzzy information input which contains the same feature information as the aforementioned fuzzy information input and has a detail portion different from that of the aforementioned fuzzy information input by use of said feedback control circuit, and said pulse-width reduction circuit is caused to learn the changed pulse-width reduction rate.

31. The device according to claim 15, wherein said converter circuit receives the components in synchronism with an input clock.

32. The device according to claim 15, further comprising an output buffer section which outputs an output of said feature extraction circuit in synchronism with an output clock.

33. A semiconductor integrated circuit device comprising:
a converter circuit which receives fuzzy information inputs containing measurable components and converts the components into pulses having pulse widths corresponding to the magnitudes thereof, and
a feature extraction circuit which receives the pulses which are divided into plural groups, selects the plural groups of pulses by using a set pulse width as a reference, and extracts feature information expressing features of the fuzzy information inputs from the fuzzy information inputs according to the number of selected pulses.

34. The device according to claim 33, further comprising a feedback control circuit which changes the set pulse width based on an actual output value of said feature extraction circuit and an output expected value of said feature extraction circuit.

35. The device according to claim 33, wherein said feature extraction circuit includes a pulse-width selection circuit which receives the plurality of pulses and selects the plurality of pulses by using the set pulse width as a reference, and a majority decision circuit which makes a majority decision to determine whether the number of selected pulses has a majority or the number of non-selected pulses has a majority.

36. The device according to claim 35, wherein said pulse-width selection circuit includes a pulse-width reduction circuit which receives the plurality of pulses and reduces pulse widths of the plurality of pulses.

37. The device according to claim 36, wherein said pulse-width reduction circuit includes plural stages of delay elements, and a switching circuit which switches outputs of said plural stages of delay elements.

38. The device according to claim 37, wherein each of said plural stages of delay elements includes an inverter circuit configured by transistors whose gates respectively contain circuit elements which each have a capacitor and a resistor connected in parallel.

39. The device according to claim 38, wherein the gate of said transistor includes a first conductive layer and a second conductive layer and has a capacitive component and a resistive component on an interface between said first and second conductive layers.

40. The device according to claim 39, wherein said first conductive layer is a conductive polysilicon layer, said second conductive layer is a metal layer and said capacitive component and resistive component are obtained by use of an insulating layer existing on the interface between said conductive polysilicon layer and said metal layer.

41. The device according to claim 35, wherein said majority decision circuit includes a weighting circuit which decides which one of the number of selected pulses and the number of non-selected pulses has a majority when the number of selected pulses is equal to the number of non-selected pulses.

42. The device according to claim 33, wherein said feature extraction circuit includes a pulse-width reduction circuit which receives the plurality of pulses and reduces the pulse widths of the plurality of pulses, a presence-of-pulse determination circuit which receives an output of said pulse-width reduction circuit to judge whether a pulse exists or not, and a majority decision circuit which receives an output of said presence-of-pulse determination circuit and makes a majority decision to determine whether the presence or absence of the pulses has a majority.

43. The device according to claim 42, further comprising a feedback control circuit which changes the pulse-width reduction rate of said pulse-width reduction circuit based on an actual output value of said majority decision circuit and an output expected value of said majority decision circuit.

44. The device according to claim 43, wherein the actual output value and the output expected value are compared with each other, and when the actual output value and the output expected value are different from each other, the pulse-width reduction rate of said pulse-width reduction circuit is changed to make the actual output value equal to the output expected value by use of said feedback control circuit.

45. The device according to claim 43, wherein the pulse-width reduction rate of said pulse-width reduction circuit is changed to derive the same feature information output as a feature information output of the fuzzy information input from a different fuzzy information input which contains the same feature information as the aforementioned fuzzy information input and has a detail portion different from that of the aforementioned fuzzy information input by use of said feedback control circuit.

46. The device according to claim 43, further comprising a reduction rate selection circuit which selects the pulse-width reduction rate of said pulse-width reduction circuit.

47. The device according to claim 46, wherein the actual output value and the output expected value are compared with each other, when the actual output value and the output expected value are different from each other, the pulse-width reduction rate of said pulse-width reduction circuit is changed to make the actual output value equal to the output expected value by use of said feedback control circuit, and said pulse-width reduction circuit is caused to learn the changed pulse-width reduction rate.

48. The device according to claim 46, wherein the pulse-width reduction rate of said pulse-width reduction circuit is changed to derive the same feature information output as a feature information output of the fuzzy information input from a different fuzzy information input which contains the same feature information as the aforementioned fuzzy information input and has a detail portion different from that of the aforementioned fuzzy information input by use of said feedback control circuit, and said pulse-width reduction circuit is caused to learn the changed pulse-width reduction rate.

49. The device according to claim 33, wherein said converter circuit receives the components in synchronism with an input clock.

50. The device according to claim 33, further comprising an output buffer section which outputs an output of said feature extraction circuit in synchronism with an output clock.

51. A semiconductor integrated circuit device comprising:
a plurality of pulse-width reduction circuits which receive the same input and on which different pulse-width reduction rates are set,
a plurality of presence-of-pulse determination circuits which respectively receive outputs of said plurality of pulse-width reduction circuits and determine whether pulses exist or not, and
a signal selection circuit which selects one of said plurality of presence-of-pulse determination circuits which is to be used and determines whether the input is a signal or noise based on the pulse existence judgment of the selected one of said presence-of-pulse determination circuits.

52. The device according to claim 51, wherein said signal selection circuit issues an internal signal when the output of the selected one of said presence-of-pulse determination circuits indicates that the pulse exists and receives the input as a signal.

53. A semiconductor integrated circuit device comprising:
a plurality of pulse-width reduction circuits which receive the same input and on which different pulse-width reduction rates are set,
a plurality of presence-of-pulse determination circuits which respectively receive outputs of said plurality of pulse-width reduction circuits and determine whether pulses exist or not, and
a majority decision circuit which receives outputs of said plurality of presence-of-pulse determination circuits, makes a majority decision to determine whether the presence or absence of the pulses has a majority, and determines whether the input is regarded as a signal or noise based on the result of the majority decision.

54. A semiconductor integrated circuit device comprising:
a plurality of functional circuit blocks,
a control circuit which receives an input command, selects at least one of said plurality of functional circuit blocks according to the input command, and causes the selected functional circuit block to function,
a feature extraction circuit which receives the input command and extracts the feature of the input command, and
a power management circuit which manages supply of power supply voltage to said functional circuit blocks based on the extracted feature.

55. The device according to claim 54, wherein said feature extraction circuit has a learning function to change an output of the extracted feature based on a plurality of expected values output from said plurality of functional circuit blocks.

56. The device according to claim 55, wherein the expected value is an operation specifying signal generated in said functional circuit blocks.

* * * * *